United States Patent
Wang et al.

(10) Patent No.: US 11,909,323 B2
(45) Date of Patent: Feb. 20, 2024

(54) CONTROL METHOD FOR INCREASING AN INVERSE GAIN RANGE OF A POWER CONVERTER

(71) Applicant: Huawei Digital Power Technologies Co., Ltd., Shenzhen (CN)

(72) Inventors: Tianyu Wang, Dongguan (CN); Weiping Liu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/847,516

(22) Filed: Jun. 23, 2022

(65) Prior Publication Data

US 2022/0345046 A1 Oct. 27, 2022

(30) Foreign Application Priority Data

Jun. 23, 2021 (CN) .......................... 202110698015.X

(51) Int. Cl.
*H02M 3/335* (2006.01)
*H02M 3/00* (2006.01)

(52) U.S. Cl.
CPC ......... *H02M 3/33573* (2021.05); *H02M 3/01* (2021.05); *H02M 3/33571* (2021.05); *H02M 3/33584* (2013.01); *H02M 3/33592* (2013.01)

(58) Field of Classification Search
CPC .............. H02M 3/33573; H02M 3/01; H02M 3/33571; H02M 3/33584; H02M 3/33592; Y02B 70/10
See application file for complete search history.

(56) References Cited

U.S. PATENT DOCUMENTS

| 8,811,039 B2 * | 8/2014 | The Ngo | H02M 3/33584 363/21.02 |
| 9,356,523 B2 * | 5/2016 | Yoshida | H02M 3/33584 |

(Continued)

FOREIGN PATENT DOCUMENTS

| CN | 103731036 A | 4/2014 |
| CN | 109245593 A | 1/2019 |

(Continued)

OTHER PUBLICATIONS

Yang Xiaoguang et al: "Analysis and Design of Full-Bridge Converter With a Simple Passive Auxiliary Circuit Achieving Adaptive Peak Current for ZVS and Low Circulating Current",IEEE Journal of Emerging and Selected Topics Electronics, IEEE, Piscataway, NJ, USA, vol. 9, No. 2, Apr. 16, 2020, XP011843492, 15 pages.

*Primary Examiner* — Yusef A Ahmed
(74) *Attorney, Agent, or Firm* — Conley Rose, P.C.

(57) ABSTRACT

A power converter includes a primary side circuit, a secondary side circuit, a transformer, and a controller. A primary side of the transformer is connected to the primary side circuit, and a secondary side of the transformer is connected to the secondary side circuit. The primary side circuit includes a resonant circuit. The secondary side circuit is configured to supply electric energy to the transformer. The transformer is configured to supply the electric energy to the primary side circuit. The primary side circuit is configured to convert the electric energy. The controller is connected to the secondary side circuit, and is configured to control, in a control cycle, the secondary side circuit to supply the electric energy to the transformer. Duration of the control cycle is greater than or equal to duration of a resonance cycle of the resonant circuit.

11 Claims, 12 Drawing Sheets

(56) References Cited

U.S. PATENT DOCUMENTS

| | | | |
|---|---|---|---|
| 9,667,159 B2* | 5/2017 | Akamatsu | H02M 3/33546 |
| 10,917,017 B1* | 2/2021 | McFarland | H02M 3/3376 |
| 11,539,300 B1* | 12/2022 | Wu | H02M 3/33573 |
| 2003/0098861 A1* | 5/2003 | Nakatsuka | H05B 41/2827 |
| | | | 345/212 |
| 2007/0070655 A1* | 3/2007 | Eguchi | H02M 1/10 |
| | | | 363/17 |
| 2011/0242855 A1* | 10/2011 | Jovcic | H02M 3/07 |
| | | | 363/17 |
| 2014/0104890 A1* | 4/2014 | Matsubara | H02M 3/3376 |
| | | | 363/17 |
| 2015/0229225 A1* | 8/2015 | Jang | H02M 3/285 |
| | | | 363/17 |
| 2015/0333634 A1* | 11/2015 | Yoshida | H02M 3/33584 |
| | | | 363/21.03 |
| 2015/0381064 A1* | 12/2015 | Matsubara | H02M 3/33584 |
| | | | 363/17 |
| 2016/0072390 A1* | 3/2016 | Akutagawa | H02M 3/33507 |
| | | | 363/17 |
| 2017/0155325 A1* | 6/2017 | Shimada | H02M 3/3376 |
| 2017/0214321 A1* | 7/2017 | Li | H02J 3/38 |
| 2018/0309372 A1* | 10/2018 | Leong | H02M 3/33546 |
| 2019/0052178 A1* | 2/2019 | Ishikura | H02M 3/33571 |
| 2019/0288607 A1* | 9/2019 | Zong | H02M 3/33584 |
| 2020/0212816 A1* | 7/2020 | Sun | H02J 7/0018 |
| 2021/0028712 A1* | 1/2021 | Yu | H01F 30/16 |
| 2021/0067045 A1* | 3/2021 | Zhang | H02M 3/33573 |
| 2021/0203236 A1* | 7/2021 | Zhang | H02M 3/33561 |
| 2021/0399644 A1* | 12/2021 | Nishikawa | H02M 3/33576 |
| 2022/0045618 A1* | 2/2022 | Kumar | H02M 3/33561 |
| 2022/0286056 A1* | 9/2022 | Chiu | H02M 3/33573 |
| 2022/0337166 A1* | 10/2022 | Chan | H02M 1/007 |
| 2022/0407426 A1* | 12/2022 | Takeshita | H02M 3/01 |
| 2023/0040992 A1* | 2/2023 | Wei | H02M 3/33573 |
| 2023/0136512 A1* | 5/2023 | Zhong | H02M 3/33569 |
| | | | 363/13 |

FOREIGN PATENT DOCUMENTS

| | | |
|---|---|---|
| CN | 107465347 B | 8/2019 |
| CN | 110168896 A | 8/2019 |
| CN | 110649821 A | 1/2020 |
| WO | 2018019100 A1 | 2/2018 |

\* cited by examiner

CONTROL METHOD FOR INCREASING AN INVERSE GAIN RANGE OF A POWER CONVERTER

CROSS-REFERENCE TO RELATED APPLICATIONS

This application claims priority to Chinese Patent Application No. 202110698015.X, filed on Jun. 23, 2021, which is hereby incorporated by reference in its entirety.

TECHNICAL FIELD

This application relates to the field of electronic technologies, and in particular, to a power converter, a method for increasing an inverse gain range of the power converter, an apparatus, a medium, and a chip.

BACKGROUND

Currently, an inductor-inductor-capacitor (LLC) resonant circuit is usually used in a power converter, and the LLC resonant circuit can reduce a component loss in the power converter. As shown in FIG. 1, the power converter may include components such as a primary side circuit, a secondary side circuit, and a transformer. When the power converter operates forward, the power converter can perform voltage conversion on input electric energy, and supply the input electric energy obtained after voltage conversion to a load side. Usually, the primary side circuit in the power converter (as shown in FIG. 2) may include a first switching network, an LLC resonant circuit (usually including a resonant inductor, a resonant capacitor, and an excitation inductor). The primary side circuit is connected to a primary side winding Pr of the transformer. The secondary side circuit may include a second switching network. The secondary side circuit is connected to a secondary side winding Sr of the transformer.

With an increase of power conversion scenarios, a bidirectional power conversion requirement is proposed, for example, the power converter is further used for inverse operating. As shown in FIG. 3, a load connected to the power converter may be a power supply or an energy storage apparatus. When the power converter operates inversely, the power converter may perform voltage conversion on a second power supply, and perform voltage conversion on and supply electric energy input by the second power supply to a first power supply.

Because the power converter is usually miniaturized and has a high frequency, the resonant inductor in the LLC resonant circuit has a small inductance, and thus a gain conversion range of the power converter is narrow when the power converter operates inversely. In addition, when the power converter operates inversely, the excitation inductor in the LLC resonant circuit does not participate in resonance, which makes a switching frequency range smaller, further leading to a narrow gain conversion range and a narrow voltage regulation range. In a power converter, a capacitor-inductor-inductor-capacitor (CLLC) resonant circuit is used, for example, a resonant inductor and a resonant capacitor are added in a secondary side circuit, to increase a gain conversion range when the power converter operates inversely. In another power converter, a quantity of resonant capacitors in an LLC resonant circuit in a primary side circuit is increased, and the resonant capacitors are switched when the power converter operates inversely, to increase a gain conversion range. However, the two power converters are more expensive and occupy more space. Therefore, currently, a solution of increasing the gain conversion range when the power converter operates inversely needs to be further studied.

SUMMARY

In view of this, this application provides a power converter, an electronic device, a method for increasing an inverse gain range of the power converter, an apparatus, a medium, and a chip, to increase a gain conversion range when the power converter operates inversely, without increasing additional costs and occupied space.

According to a first aspect, this application provides a power converter, including: a primary side circuit, a secondary side circuit, a transformer, and a controller. A primary side of the transformer is connected to the primary side circuit, and a secondary side of the transformer is connected to the secondary side circuit. The primary side circuit includes a resonant circuit. The secondary side circuit is configured to supply electric energy to the transformer. The transformer is configured to supply the electric energy to the primary side circuit. The primary side circuit is configured to convert the electric energy. The controller is connected to the secondary side circuit, and is configured to control, in a control cycle, the secondary side circuit to supply the electric energy to the transformer. Duration of the control cycle is greater than or equal to duration of a resonance cycle of the resonant circuit.

When the power converter provided in this embodiment of this application operates inversely, for example, when the electric energy is transmitted from the secondary side circuit to the primary side circuit, a large gain conversion range may be obtained. In an example, no additional elements need to be added to the primary side circuit and the secondary side circuit of the power converter, and the controller in the power converter can control, in the control cycle, the secondary side circuit to supply the electric energy to the transformer, so that the secondary side circuit can operate in the control cycle, and an operating cycle of the secondary side circuit is the same as the control cycle. In addition, duration of the operating cycle of the secondary side circuit is greater than or equal to the duration of the resonance cycle of the resonant circuit, and an operating frequency of the secondary side circuit is less than or equal to a resonance frequency of the resonant circuit, so that a gain can be reduced, thereby increasing a gain conversion range. In this case, a current in the secondary side circuit is low, and a switch-off current in the secondary side circuit is also low, which can prevent a switch from being damaged.

In a possible design, the secondary side circuit may include a switching network, and the switching network includes a first bridge arm and a second bridge arm. The first bridge arm and the second bridge arm are connected in parallel, the first bridge arm includes a first upper bridge arm switch and a first lower bridge arm switch connected in series, and the second bridge arm includes a second upper bridge arm switch and a second lower bridge arm switch connected in series. A connection point between the first upper bridge arm switch and the first lower bridge arm switch is connected to a first end of the secondary side of the transformer, and a connection point between the second upper bridge arm switch and the second lower bridge arm switch is connected to a second end of the secondary side of the transformer. The controller is connected to control ends of the first upper bridge arm switch, the first lower bridge arm switch, the second upper bridge arm switch, and the second lower bridge arm switch, and is configured to: in the control cycle, drive the first upper bridge arm switch by using a first control signal, drive the first lower bridge arm switch by using a second control signal, drive the second upper bridge arm switch by using a third control signal, and drive the second lower bridge arm switch by using a fourth control signal. In the control cycle, when a level of the first control signal is a first level, a level of the second control signal is a second level, and when the level of the first control signal is the second level, the level of the second control signal is the first level. In each control cycle, when a level of the third control signal is the first level, a level of the fourth control signal is the second level, and when the level of the third control signal is the second level, the level of the fourth control signal is the second level. The first level is used to drive the switch to be in a conducted state, and the second level is used to drive the switch to be in a disconnected state.

In the control cycle, both the level of the first control signal and the level of the fourth control signal are first duration of the first level, where the first duration is less than or equal to half of the resonance cycle, and both the level of the second control signal and the level of the third control signal are second duration of the first level, where the second duration is less than or equal to half of the resonance cycle.

In this embodiment of this application, the secondary side circuit may provide alternating current electric energy for the transformer, and the controller may control switches of bridge arms in the switching network in the secondary side circuit. In each control cycle, the first control signal for driving the first upper bridge arm switch and the second control signal for driving the first lower bridge arm switch have a complementary relationship, and the third control signal for driving the second upper bridge arm switch and the fourth control signal for driving the second lower bridge arm switch have a complementary relationship. The secondary side circuit may transmit the electric energy to the transformer in a time period in which the first control signal and the fourth control signal have a same level. For example, the secondary side circuit may supply the electric energy to the transformer in the first duration in which both the level of the first control signal and the level of the fourth control signal are the first level, and the secondary side circuit may supply the electric energy to the transformer in the second duration in which both the level of the second control signal and the level of the third control signal are the first level. Current directions in the secondary side circuit in the first duration and the second duration may be different. The controller may control the first duration and the second duration to be less than half of the duration of the resonance cycle, so that total duration of supplying the electric energy to the transformer by the secondary side circuit is less than the duration of the resonance cycle, so that the gain can be reduced, thereby increasing the gain conversion range. In addition, the operating frequency of the secondary side circuit is less than or equal to the resonance frequency of the resonant circuit, so that a current in a circuit can be reduced, and a current of each switch in the secondary side circuit is low when the switch is conducted or disconnected, thereby preventing the switch from being damaged.

In a possible design, the controller is further configured to: increase the duration of the control cycle, to reduce switching frequencies of the upper bridge arm switch and the lower bridge arm switch, where the operating frequency is less than or equal to the resonance frequency of the resonant circuit.

In this embodiment of this application, the controller may further reduce the gain by increasing duration of the control cycle of each switch, for example, reducing a frequency of the switch in the secondary side circuit, thereby increasing the gain conversion range.

In a possible design, in the control cycle, a time difference between a first start moment at which the first control signal is the first level and a second start moment at which the fourth control signal is the first level is greater than zero. The controller is further configured to increase the time difference to shorten the first duration and the second duration.

In this embodiment of this application, the time difference may also be referred to as a phase difference between the first control signal and the fourth control signal. Because the second control signal is complementary to the first control signal, and the third control signal is complementary to the fourth control signal, a phase difference between the third control signal and the fourth control signal is also the time difference. In this case, it can be understood that there is a phase difference between control signals of switches of two bridge arms in the switching network. The controller may control the fourth control signal to lag behind the first control signal, or phase shift the fourth control signal, to adjust the first duration and the second duration in which the secondary side circuit supplies the electric energy to the transformer. The controller may increase the phase difference between the fourth control signal and the first control signal, to reduce duration in which the secondary side circuit supplies the electric energy to the transformer in each control cycle, thereby increasing the gain conversion range.

In a possible design, the secondary side circuit further includes an excitation inductor, the excitation inductor is connected in parallel to the switching network, and the excitation inductor is configured to enable the first upper bridge arm switch, the first lower bridge arm switch, the second upper bridge arm switch, and the second lower bridge arm switch to be in a conducted state or a disconnected state when a voltage is zero.

In this embodiment of this application, the secondary side circuit may include the excitation inductor that generates a lagging current when the secondary side circuit supplies the electric energy to the transformer. The current may enable each switch in the switching network to operate in a soft-switching state, for example, each switch is in a conducted state when a voltage is zero, or in a disconnected state when a voltage is zero. In this way, a switching loss in the secondary side circuit can be reduced.

According to a second aspect, this application provides an electronic device, including the power converter according to the first aspect and any design thereof. An input end of a primary side circuit of the power converter is configured to connect to a first power supply or a first energy storage apparatus, and an input end of a secondary side circuit of the power converter is configured to connect to a second power supply or a second energy storage apparatus.

In this embodiment of this application, the second power supply or the second energy storage apparatus may supply first electric energy to the power converter. When the power converter operates inversely, the power converter also has a large gain range when converting the first electric energy. The power converter may supply the converted electric energy to the first power supply or the first energy storage apparatus.

According to a third aspect, this application provides a method for increasing an inverse gain range of a power converter. The method is applied to the power converter according to the first aspect and the design thereof. The method includes: A controller generates a control signal; and the controller controls, in a control cycle based on the control signal, the secondary side circuit to supply the electric energy to the transformer, where duration of the control cycle is greater than or equal to duration of a resonance cycle of the resonant circuit.

In a possible design, that the controller controls, in a control cycle based on the control signal, the secondary side circuit to supply the electric energy to the transformer includes: In the control cycle, the controller drives the first upper bridge arm switch by using a first control signal, the first lower bridge arm switch by using a second control signal, the second upper bridge arm switch by using a third control signal, and the second lower bridge arm switch by using a fourth control signal. In the control cycle, when a level of the first control signal is a first level, a level of the second control signal is a second level, and when the level of the first control signal is the second level, the level of the second control signal is the first level. In the control cycle, when a level of the third control signal is the first level, a level of the fourth control signal is the second level, and when the level of the third control signal is the second level, the level of the fourth control signal is the second level. The first level is used to drive the switch to be in a conducted state, and the second level is used to drive the switch to be in a disconnected state. In the control cycle, both the level of the first control signal and the level of the fourth control signal are first duration of the first level, where the first duration is less than or equal to half of the resonance cycle, and both the level of the second control signal and the level of the third control signal are second duration of the first level, where the second duration is less than or equal to half of the resonance cycle.

In a possible design, the method further includes: The controller increases the duration of the control cycle, to reduce switching frequencies of the upper bridge arm switch and the lower bridge arm switch, where the switching frequency is less than or equal to a resonance frequency of the resonant circuit.

In a possible design, in the control cycle, a time difference between a first start moment at which the first control signal is the first level and a second start moment at which the fourth control signal is the first level is greater than zero. The method further includes: The controller increases the time difference to shorten the first duration and the second duration.

According to a fourth aspect, this application provides a control apparatus. The apparatus includes a processor and a memory, the memory is configured to store a program, instructions, or code, and the processor is configured to execute the program, the instructions, or the code in the memory, to complete the method according to the second aspect and any design thereof.

According to a fifth aspect, this application provides a non-volatile computer-readable storage medium, configured to store a computer program. The computer program is loaded by using a processor to perform the method according to the second aspect and any design thereof.

According to a sixth aspect, this application provides a chip. The chip may be coupled to a memory, and is configured to invoke and execute computer program instructions stored in the memory, so that the method according to the second aspect and any design thereof is performed.

These aspects or other aspects of this application are clearer and more comprehensible in descriptions of the following embodiments.

DESCRIPTION OF EMBODIMENTS

Figure 4:
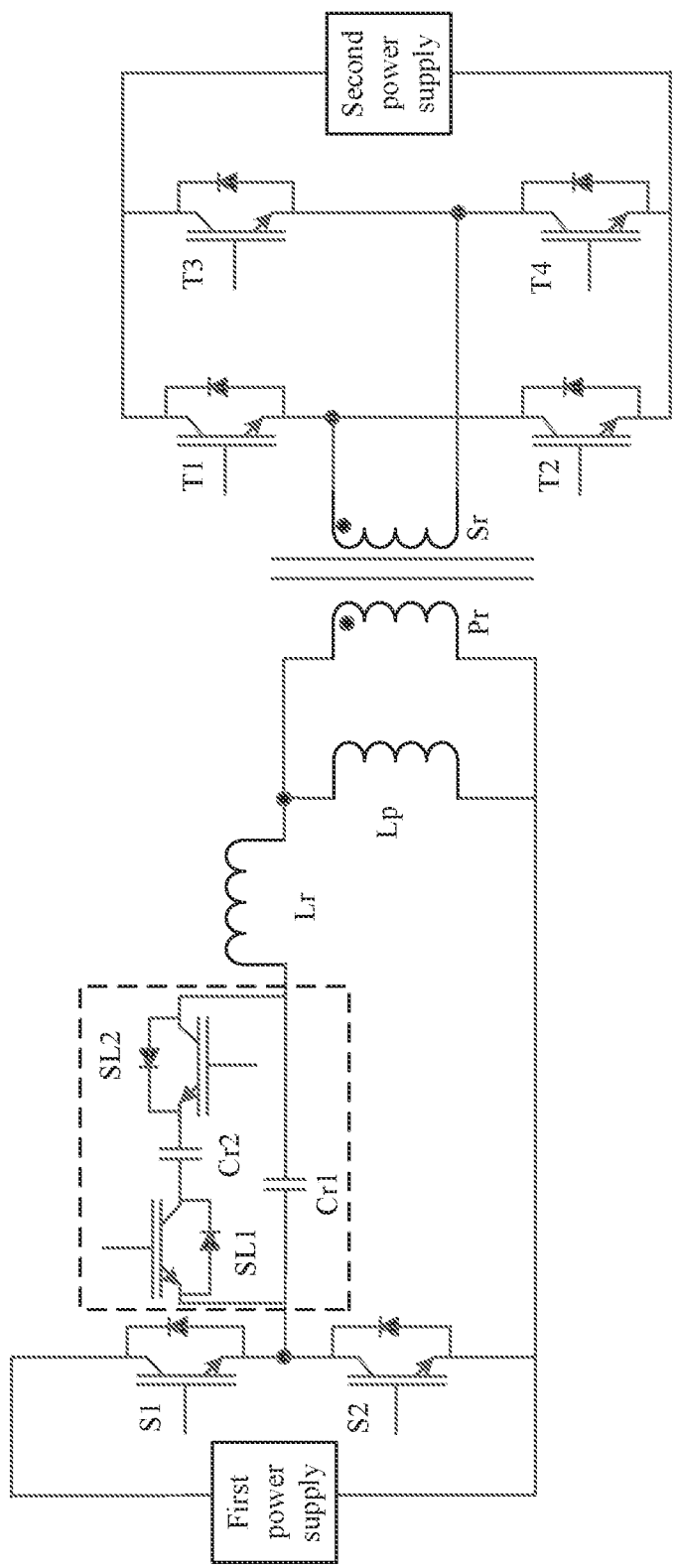
FIG. 4 is a schematic diagram of a structure of a power converter with a tunable resonant capacitor.

In order to increase a gain when a power converter operates inversely, a first solution is to change a structure of an LLC resonant circuit in a primary side circuit of the power converter. In a circuit structure shown in a dashed box in FIG. 4, in an existing power converter, a resonant capacitor Cr in an LLC resonant circuit in a primary side circuit is replaced with a resonant capacitor unit. The resonant capacitor unit includes a resonant capacitor Cr1, a resonant capacitor Cr2, a switch SL1, and a switch SL2. The resonant capacitor Cr2, the switch SL1, and the switch SL2 are sequentially connected in series to form a branch, and the resonant capacitor Cr1 and the branch are connected in parallel, where a direction of the switch SL1 and a direction of the switch SL2 are opposite. A controller may control the switch SL1 and the switch SL2.

When the existing power converter operates forward, the controller controls the switch SL1 and the switch SL2 to be in a disconnected state, so that the resonant capacitor Cr2 does not participate in resonance. In this case, a resonant capacitor value is a capacitance value of the resonant capacitor Cr1, a resonance frequency is the maximum, and an operating frequency may vary around a resonance point. When the existing power converter operates inversely, the controller controls the switch SL1 and the switch SL2 to be in a conducted state, so that the resonant capacitor Cr2 participates in resonance. In this case, a resonant capacitor value is a sum of a capacitance value of the resonant capacitor Cr1 and a capacitance value of the resonant capacitor Cr2, and a resonance frequency is the lowest.

By increasing the resonant capacitance value when the existing power converter operates inversely, a frequency of the resonance point when the power converter operates inversely is lower than a frequency of the resonance point when the power converter operates forward, thereby increasing a gain conversion range when the power converter operates inversely. However, the existing power converter adds the resonant capacitor unit in the LLC resonant circuit in the primary side circuit, which increases a quantity of switches and resonant capacitors, increases costs of a hardware circuit, and also increases occupied space.

Figure 1:
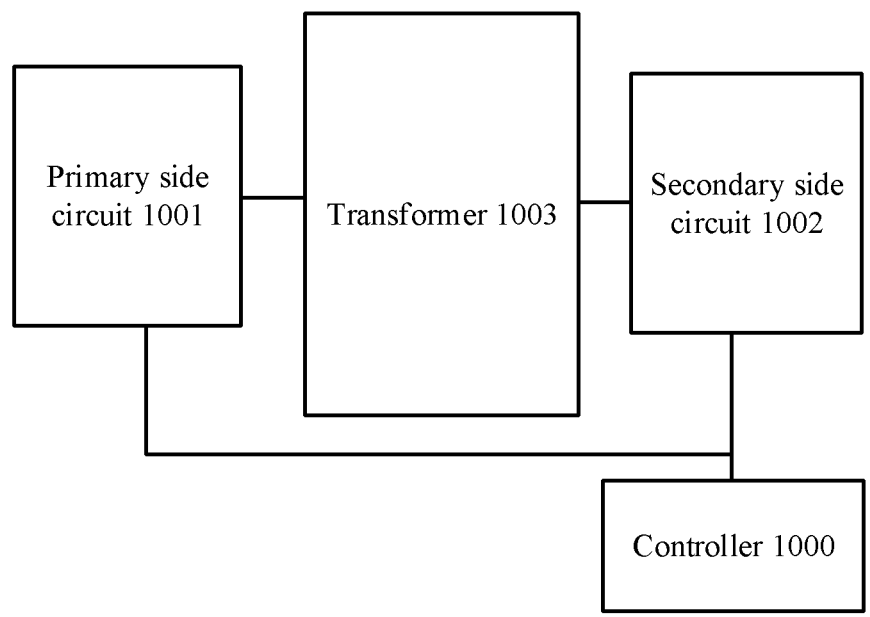
FIG. 1 is a schematic diagram of a structure of a power converter.
Figure 2:
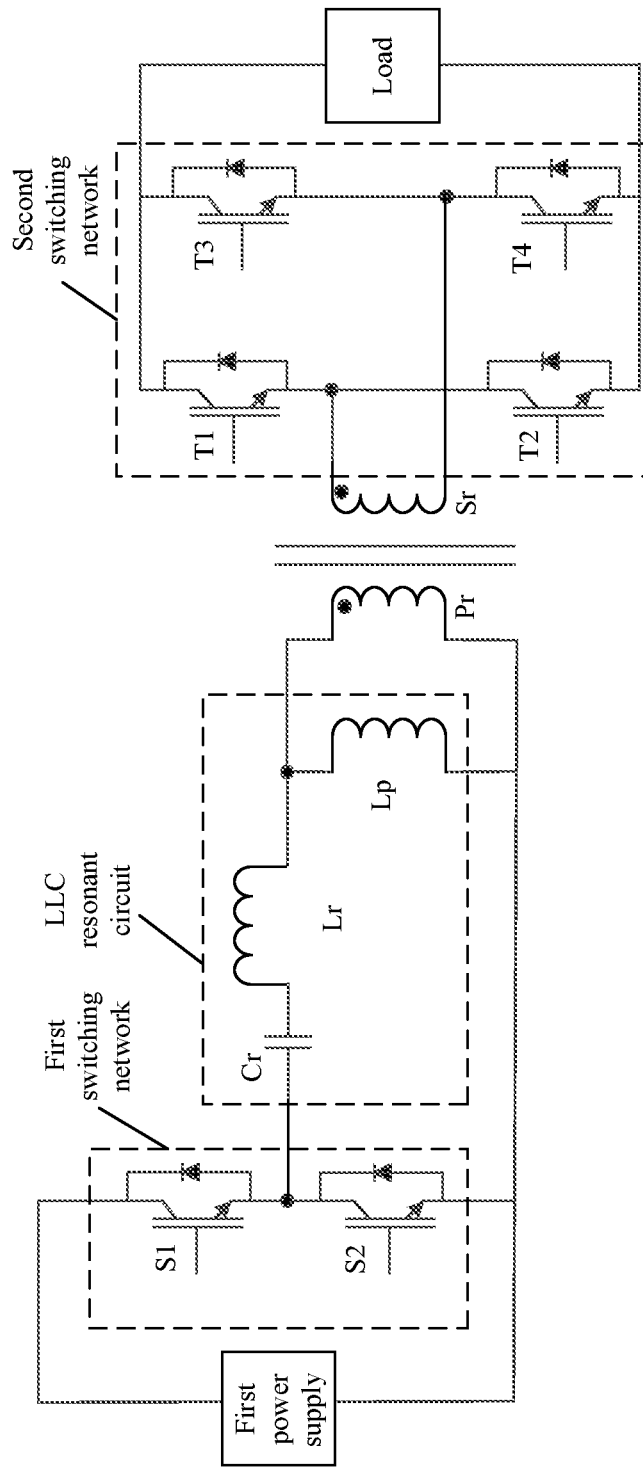
FIG. 2 is a schematic diagram of a structure of a circuit of a power converter.

In a second solution, no additional hardware is added to a structure of a conventional power converter shown in FIG. 1. Instead, a controller simultaneously drives switches in a primary side circuit and a secondary side circuit when the power converter operates inversely. Switching frequencies in the primary side circuit and the secondary side circuit are the same, duty cycles of drive signals of switches are different, and the switching frequencies are lower than a resonance frequency. Usually, a duty cycle is 50% when the controller drives a drive signal of a switch in a switching network in the primary side circuit, and a duty cycle is half of a resonance cycle when the controller drives a drive signal of a switch in a switching network in the secondary side circuit. The solution requires the controller to simultaneously drive the switches of the primary side circuit and the secondary side circuit, and a drive loss is high. Usually, a drive signal is provided to each switch through a pulse width modulation (PWM) output port of a digital signal processing (DSP) controller. Therefore, a plurality of PWM ports of the DSP controller need to be occupied for control, and a large quantity of chip resources are occupied. In addition, if a requirement of soft-switching of hard switching or non-zero voltage switching (ZVS) in the power converter further needs to be considered, a switching driving timing control of the primary side circuit and the secondary side circuit is complicated.

In view of this, embodiments of this application provide a power converter, an electronic device, a method for increasing an inverse gain range, an apparatus, and a medium, which are used to increase, based on a conventional power converter structure, a gain conversion range when the power converter operates inversely, without increasing additional hardware costs and occupied space.

To make objectives, technical solutions, and advantages of this application clearer, the following further describes this application in detail with reference to the accompanying drawings. An operation method in a method embodiment may also be applied to an apparatus embodiment or a system embodiment. It should be noted that in the description of this application, "at least one" means one or more, and "a plurality of" means two or more. In view of this, in embodiments of this application, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/", unless otherwise specified, generally represents an "or" relationship between the associated objects. In addition, it should be understood that in descriptions of this application, terms such as "first" and "second" are merely used for distinguishing and description, but should not be understood as an indication or implication of relative importance, or an indication or implication of a sequence.

It should be noted that the "connection" in embodiments of this application may be understood as an electric connection, and a connection of two electrical elements may be a direct connect or an indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C. In some scenarios, the "connection" may alternatively be understood as coupling, for example, electromagnetic coupling between two inductors. In short, a connection between A and B enables electric energy transmission between A and B.

It should be noted that a switching transistor and a switch in embodiments of this application may be one or more types of switching transistors such as a relay, a metal-oxide-semiconductor field-effect transistor (MOSFET), a bipolar junction transistor (BJT), and an insulated gate bipolar transistor (IGBT), which are not listed one by one in embodiments of this application. Each switching transistor may include a first electrode, a second electrode, and a control electrode, where the control electrode is used to control the switching transistor to be conducted or disconnected. When the switching transistor is conducted, a current can be transmitted between the first electrode and the second electrode of the switching transistor, and when the switching transistor is disconnected, a current cannot be transmitted between the first electrode and the second electrode of the switching transistor. The MOSFET is used as an example. The control electrode of the switching transistor is a gate, the first electrode of the switching transistor may be a source of the switching transistor, and the second electrode may be a drain of the switching transistor, or the first electrode may be a drain of the switching transistor, and the second electrode may be a source of the switching transistor.

The following clearly describes the technical solutions in embodiments of this application with reference to the accompanying drawings in embodiments of this application. As shown in FIG. 1, a power converter may include a primary side circuit 1001, a secondary side circuit 1002, a transformer 1003, and a controller 1000. The primary side circuit 1001 is connected to a primary side of the transformer 1003, and the secondary side circuit 1002 is connected to a secondary side of the transformer 1003.

Usually, when the power converter operates forward, input electric energy (which may be provided by a first power supply) may be transmitted to a load side (which may be an energy storage component or a power supply component, for example, a second power supply) through the primary side circuit 1001, the transformer 1003, and the secondary side circuit 1002. When the power converter operates inversely, electric energy supplied by the load side may be transmitted to the first power supply side through the secondary side circuit 1002, the transformer 1003, and the primary side circuit 1001.

In the power converter provided in this embodiment of this application, the controller 1000 may be connected to the secondary side circuit 1002, and may generate a plurality of control signals, to control the secondary side circuit 1002 to operate, so that the electric energy is transmitted to the first power supply side connected to the primary side circuit 1001 through the secondary side circuit 1002 and the transformer 1003, to implement inverse operation of the power converter. For example, the controller 1000 may be any one of a microcontroller unit (MCU), a central processing unit (CPU), a general purpose processor, a DSP, an application-specific integrated circuit (ASIC), a field-programmable gate array (FPGA), or the like, or may be any one or a combination of another programmable logic device, a transistor logic device, or a hardware component.

The following describes the primary side circuit 1001, the secondary side circuit 1002, and the transformer 1003 by using examples.

In this embodiment of this application, the primary side of the transformer 1003 is connected to the primary side circuit 1001, and the secondary side of the transformer 1003 is connected to the secondary side circuit 1002. When the power converter operates forward, the transformer 1003 may output the electric energy to the secondary side circuit 1002. When the power converter operates inversely, the transformer 1003 may output the electric energy to the primary side circuit 1001.

Figure 3:
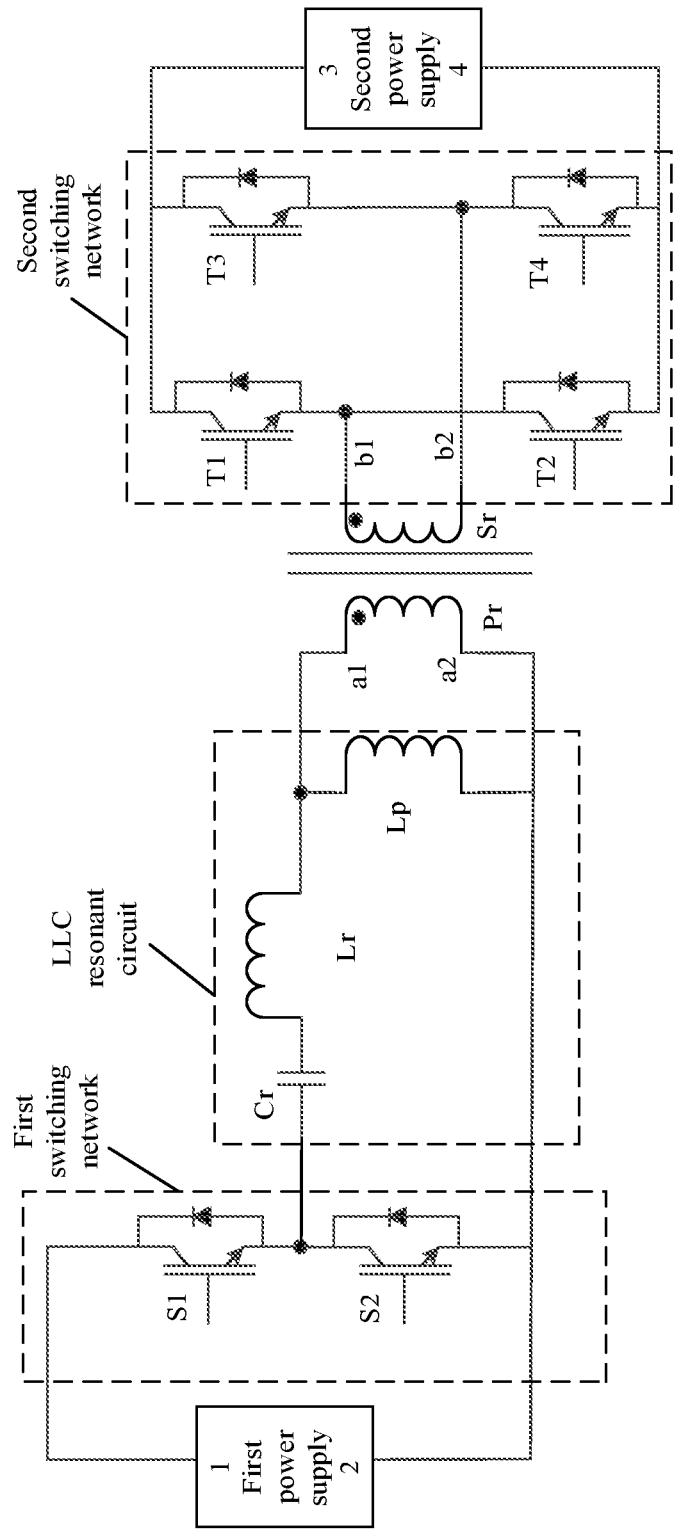
FIG. 3 is a schematic diagram of a structure of a circuit of a power converter.

For example, as shown in FIG. 3, a primary side of a transformer 1003 includes a primary side winding Pr, and a secondary side of the transformer 1003 includes a secondary side winding Sr. Two ends (a1 and a2) of the primary side winding Pr are connected to the primary side circuit 1001. Two ends (b1 and b2) of the secondary side winding Sr are connected to the secondary side circuit 1002. When the power converter operates forward, the two ends of the primary side winding Pr may receive electric energy output by the primary side circuit 1001, and the two ends of the secondary side winding Sr may output electric energy to the secondary side circuit 1002. When the power converter operates inversely, the two ends of the secondary side winding Sr may receive the electric energy output by the secondary side circuit 1002, and the two ends of the primary side winding may output electric energy to the primary side circuit 1001.

In this embodiment of this application, the primary side circuit 1001 may include an LLC resonant circuit and a first switching network. The LLC resonant circuit may include at least a resonant capacitor Cr and a resonant inductor Lr. Optionally, the LLC resonant circuit may further include an excitation inductor Lp. The first switching network may include at least one bridge arm, and each bridge arm may include two switches connected in series.

In an example, the first switching network may include one bridge arm including a switch S1 and a switch S2 connected in series. As shown in FIG. 3, a first electrode of the switch S1 is connected to a first pole 1 of the first power supply, and a second electrode of the switch S1 is separately connected to a first end of the LLC resonant circuit and a first electrode of the switch S2. A second electrode of the switch S2 is separately connected to a second pole 2 of the first power supply and a second end of the LLC resonant circuit. In addition, the second electrode of the switch S2 is further connected to the a2 end of the primary side winding Pr, and a third end of the LLC resonant circuit is connected to a1 of the primary side winding Pr, so that the primary side circuit 1001 can output electric energy to the primary side winding Pr, or the primary side winding Pr can output electric energy to the primary side circuit 1001. The primary side circuit 1001 in this example may also be referred to as a half-bridge resonant circuit.

Figure 5:
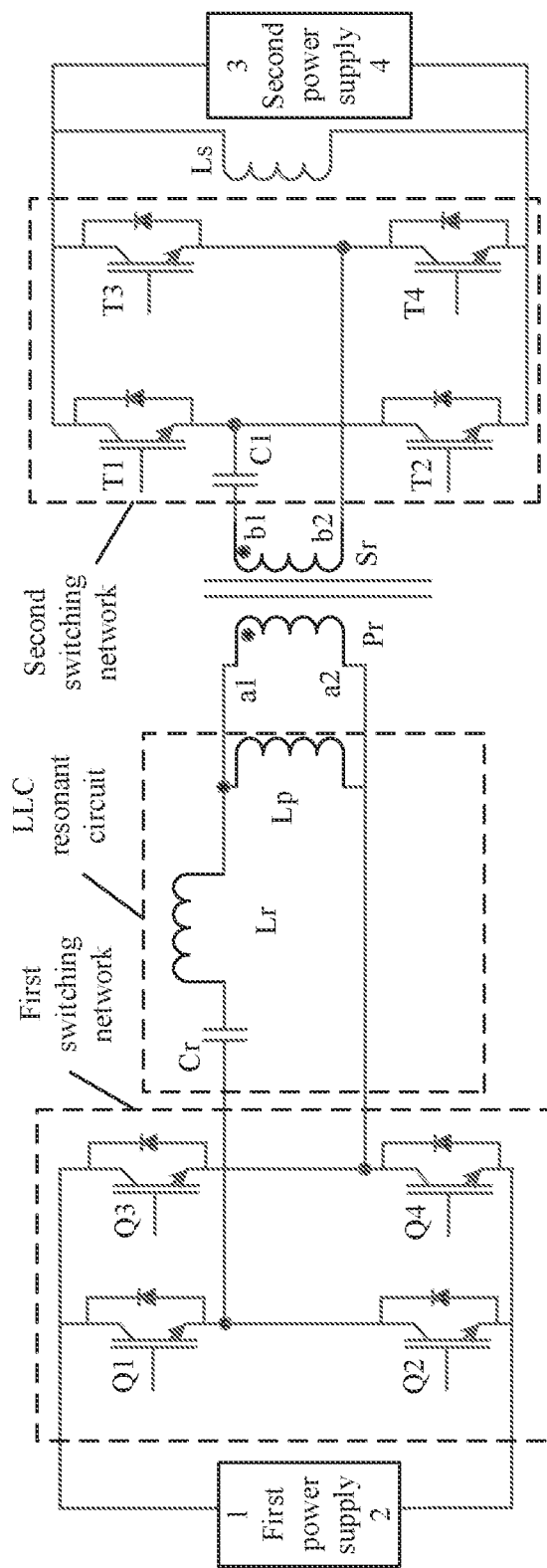
FIG. 5 is a schematic diagram of a structure of a circuit of a power converter.

In another example, the first switching network may include a plurality of bridge arms. As shown in FIG. 5, the first switching network includes two bridge arms, respectively denoted as a bridge arm 1 and a bridge arm 2, and each bridge arm includes two switches connected in series. The bridge arm 1 may include a switch Q1 (an upper bridge arm switch of the bridge arm 1) and a switch Q2 (a lower bridge arm switch of the bridge arm 1) connected in series. The bridge arm 2 may include a switch Q3 (an upper bridge arm switch of the bridge arm 2) and a switch Q4 (a lower bridge arm switch of the bridge arm 2) connected in series. A first electrode of the switch Q1 is connected to the first pole 1 of the first power supply, and a second electrode of the switch Q1 is separately connected to the first end of the LLC resonant circuit and a first electrode of the switch Q2. A second electrode of the switch Q2 is connected to the second pole 2 of the first power supply. A first electrode of the switch Q3 is connected to the first pole 1 of the first power supply, and a second electrode of the switch Q3 is separately connected to the second end of the LLC resonant circuit and a first electrode of the switch Q4. A second electrode of the switch Q4 is connected to the second pole 2 of the first power supply. In addition, the first electrode of the switch Q4 is further connected to the a2 end of the primary side winding Pr, and the third end of the LLC resonant circuit is connected to the a1 end of the primary side winding Pr, so that the primary side circuit 1001 can output electric energy to the primary side winding Pr, or the primary side winding Pr can output electric energy to the primary side circuit 1001. The primary side circuit 1001 in this example may be referred to as a full bridge resonant circuit.

In this embodiment of this application, the secondary side circuit 1002 may include a second switching network. The second switching network may include a plurality of bridge arms, and each bridge arm may include two switches connected in series. As shown in FIG. 3, the second switching network may include two bridge arms, respectively denoted as a bridge arm 3 and a bridge arm 4. The bridge arm 3 may include a switch T1 and a switch T2 connected in series, and the bridge arm 4 may include a switch T3 and a switch T4 connected in series. A first electrode of the switch T1 is connected to a first pole 3 of the second power supply, and a second electrode of the switch T1 is connected to a first electrode of the switch T2. A second electrode of the switch T2 is connected to a second pole 4 of the second power supply. A first electrode of the switch T3 is connected to the first pole 3 of the second power supply, and a second electrode of the switch T3 is connected to a first electrode of the switch T4. A second electrode of the switch T4 is connected to the second pole 4 of the second power supply. In addition, the second electrode of the switch Q1 is further connected to the b1 end of the secondary side winding Sr, and the first electrode of the switch Q4 is further connected to the b2 end of the secondary side winding Sr, so that the secondary side circuit 1002 can output electric energy to the secondary side winding Sr, or the secondary side winding Sr may output electric energy to the secondary side circuit 1002.

In a possible design, the secondary side circuit 1002 may include a first capacitor C1. One end of the first capacitor C1 may be connected to the b1 end of the secondary side winding Sr, and the other end of the first capacitor C1 may be connected to the second electrode of the switch Q1. When the secondary side circuit 1002 outputs an alternating current, the first capacitor C1 is charged and discharged, so that the alternating current flows into the secondary side winding Sr. Usually, the first capacitor C1 may prevent saturation of the transformer. Optionally, the secondary side circuit 1002 may include a resonant device, such as a resonant capacitor and/or a resonant inductor.

The controller 1000 may be connected to a control electrode of each switch in the secondary side circuit 1002, and is configured to control a conducted state or a disconnected state of each switch.

When the power converter operates forward, the secondary side circuit 1002 may receive the electric energy provided by the primary side circuit 1001. The secondary side circuit 1002 may be used for rectification. Parasitic diodes in the switch T1, the switch T2, the switch T3, and the switch T4 may be used for rectification. Alternatively, the controller 1000 may control the switches in the secondary side circuit 1002 to perform rectification.

When the power converter operates inversely, the secondary side circuit 1002 may receive first electric energy provided by the second power supply. The secondary side circuit 1002 converts electric energy usually supplied by the second power supply into alternating current electric energy under control of the controller 1000, and inputs the alternating current electric energy to the primary side circuit 1001 through the transformer. Usually, electric energy provided by the second power supply is direct current electric energy.

Figure 6:
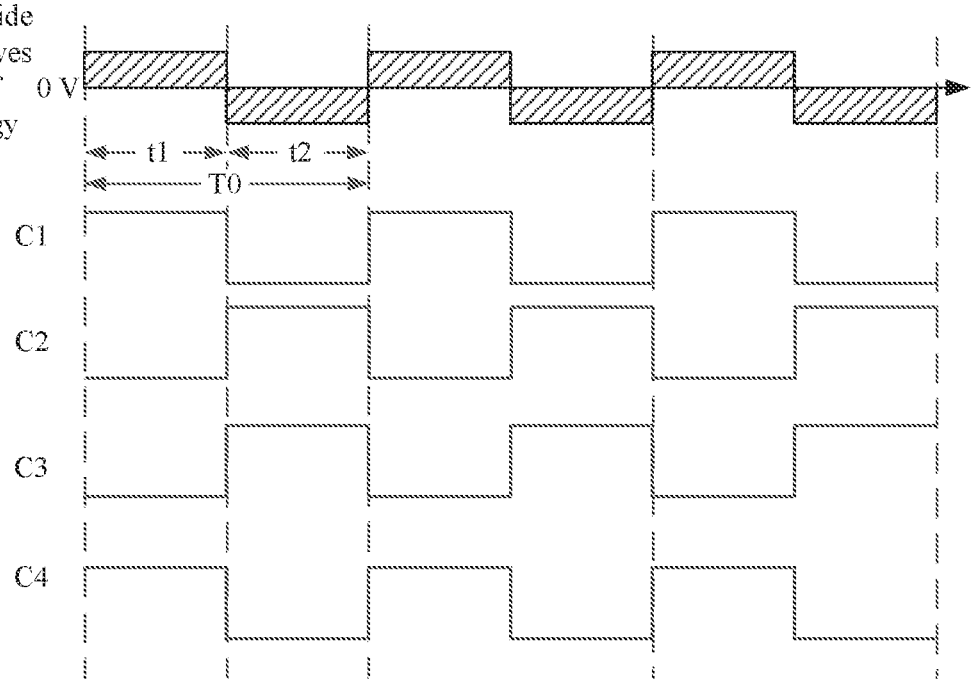
FIG. 6 is a schematic diagram of a control signal of a switch in a primary side circuit and a secondary side circuit.

The controller 1000 may control, by sending a secondary side control signal in a control cycle, the secondary side circuit 1002 to convert received direct current electric energy into alternating current electric energy. FIG. 6 shows an example of a timing diagram of each control signal. A control signal C1 is used to control conduction and disconnection of the switch T1, and a control signal C2 is used to control conduction and disconnection of the switch T2. The control signal C1 and the control signal C2 are complementary. A control signal C3 is used to control conduction and disconnection of the switch T3, and a control signal C4 is used to control conduction and disconnection of the switch T4. The control signal C3 and the control signal C4 are complementary. In this embodiment of this application, that a first signal and a second signal are complementary may indicate that there is a complementary relationship between the first signal and the second signal. In an example, when the first signal has a high level, the second signal has a low level, and when the first signal has a low level, the second signal has a high level. In other words, the level of the first signal and the level of the second signal are not both high and low.

In this embodiment of this application, a first level may drive a switch to be in a conducted state, and a second level may drive the switch to be in a disconnected state. The first level may be a high level and the second level may be a low level, or the first level is a low level and the second level is a high level. For ease of description, the following uses an example in which the first level is a high level and the second level is a low level. As shown in FIG. 6, duration of a control cycle of each of the control signal C1 and the control signal C4 is T0, the control signal C1 and the control signal C4 have high levels in a time period t1 (also referred to as a first half cycle of a cycle) of each control cycle, and the control signal C1 and the control signal C4 have low levels in a rest time period. It can be learned that a waveform of the control signal C4 corresponding to the switch T4 in the bridge arm 4 is the same as a waveform of the control signal C1 corresponding to the switch T1 in the bridge arm 3. Duration of a cycle of each of the control signal C2 and the control signal C3 is T0, the control signal C2 and the control signal C3 have high levels in a time period t2 (also referred to as a second half cycle of a cycle) of each control cycle, and the control signal C2 and the control signal C3 have low levels in a rest time period. It can be learned that a waveform of the control signal C3 corresponding to the switch T3 in the bridge arm 4 is the same as a waveform of the control signal C2 corresponding to the switch T2 in the bridge arm 3.

Usually, duration of the time period t1 is the same as duration of the time period t2. In an actual application scenario, the time period t1 and the time period t2 may separately include dead duration of the switch.

Figure 7A:
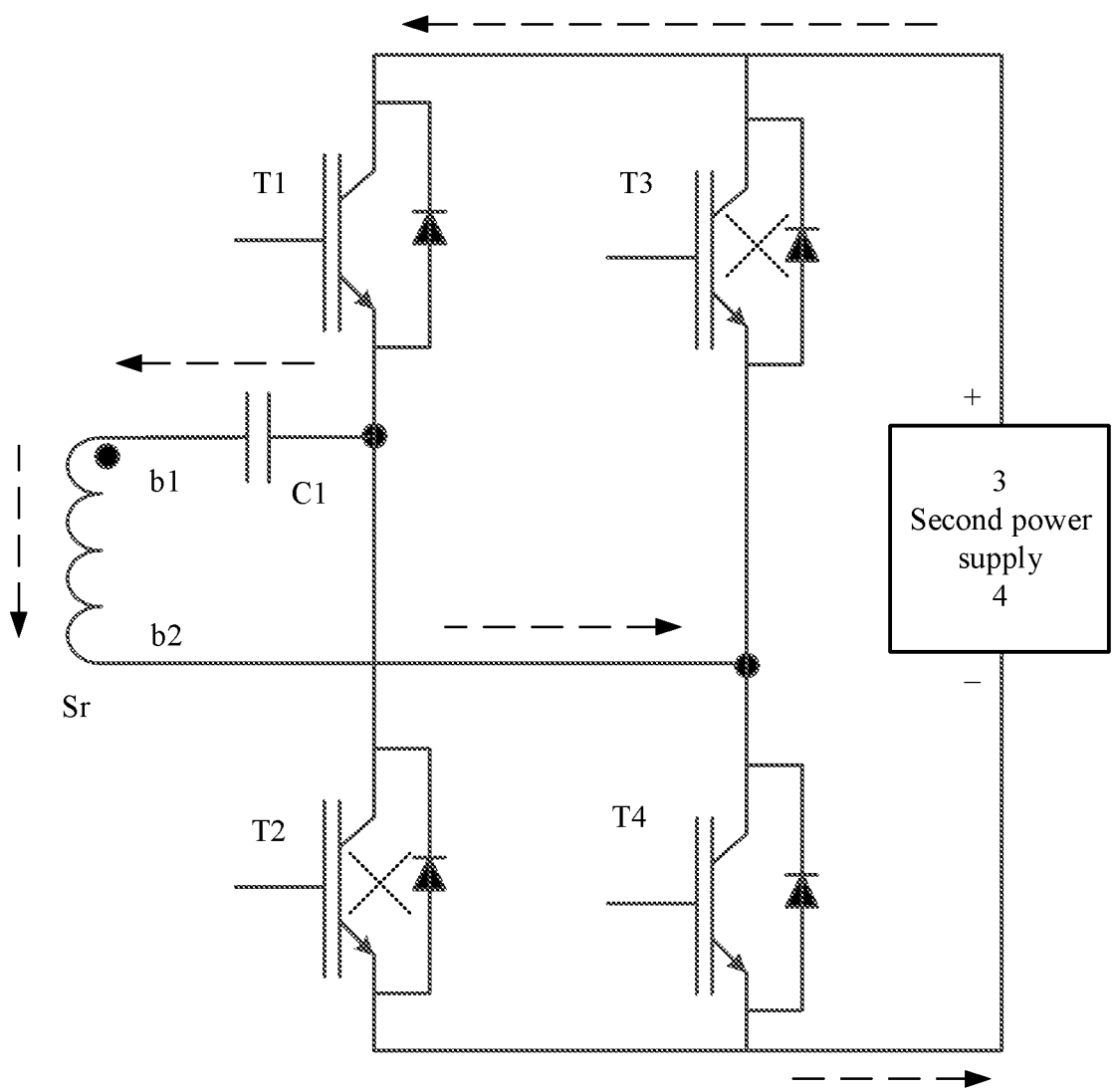
FIG. 7A is a schematic diagram of a switching state of a secondary side circuit.

For example, a first end 3 of the second power supply is a positive electrode, and a second end 4 thereof is a negative electrode. In the time period t1, a switching state of the secondary side circuit 1002 may be shown in FIG. 7A, the switch T1 and the switch T4 are conducted, and the switch T2 and the switch T3 are disconnected. As indicated by arrows in FIG. 7A, in the time period t1, a current is input from a high potential end (for example, an end connected to the positive electrode of the second power supply) of the secondary side circuit 1002, sequentially flows through the switch T1, the secondary side winding Sr, and the switch T4, and is output from a low potential end of the secondary side circuit 1002. In this case, a potential at the b1 end of the secondary side winding Sr is greater than a potential at the b2 end of the secondary side winding Sr. As shown in a shadowed part in the time period t1 in FIG. 6, a voltage of electric energy received by the secondary side winding Sr is in a positive half cycle, for example, a potential difference obtained after the potential at the b2 end is subtracted from the potential at the b1 end is positive.

Figure 7B:
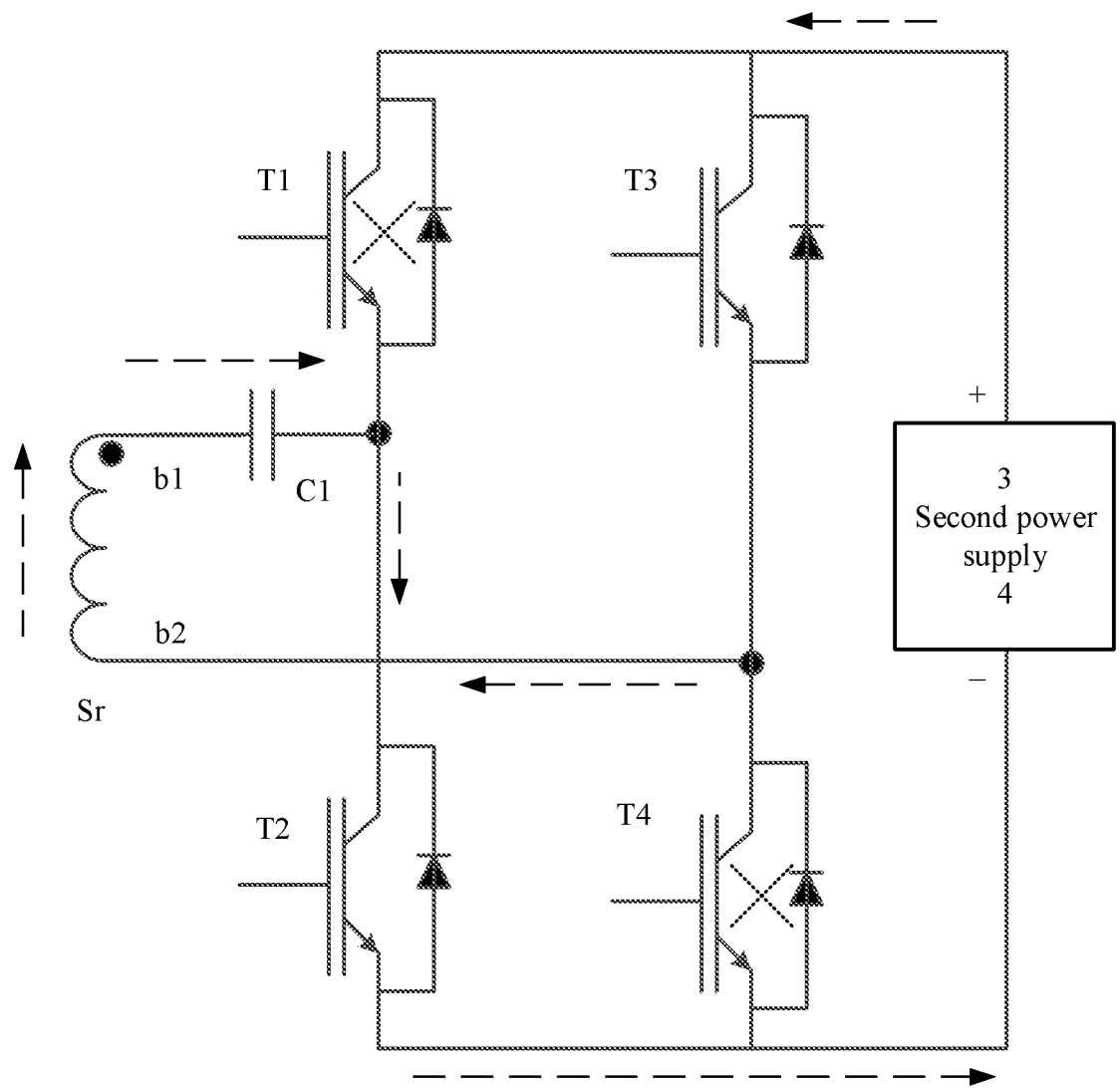
FIG. 7B is a schematic diagram of a switching state of a secondary side circuit.

In the time period t2, the switching state of the secondary side circuit 1002 may be shown in FIG. 7B, the switch T1 and the switch T4 are disconnected, and the switch T2 and the switch T3 are conducted. As indicated by arrows in FIG. 7B, in the time period t2, a current is input from the high potential end of the secondary side circuit 1002 (for example, the end connected to the positive electrode of the second power supply), sequentially flows through the switch T3, the secondary side winding Sr, and the switch T3, and is output from the low potential end of the secondary side circuit 1002. In this case, the potential at the b2 end of the secondary side winding Sr is greater than the potential at the b1 end of the secondary side winding Sr. As shown in a shadowed part in the time period t2 in FIG. 6, a voltage of electric energy received by the secondary side winding Sr is in a negative half cycle, for example, a potential difference obtained after the potential at the b1 end is subtracted from the potential at the b2 end is positive.

It can be learned that the controller 1000 can control the switching transistors T1 and T4 and the switching transistors T2 and T3 to be alternately conducted and disconnected, so that a current direction at the secondary side winding Sr is alternately changed, and a voltage direction between the b1 end and the b2 end is also alternately changed. Therefore, alternating current electric energy can be supplied to the secondary side winding Sr.

Figure 8:
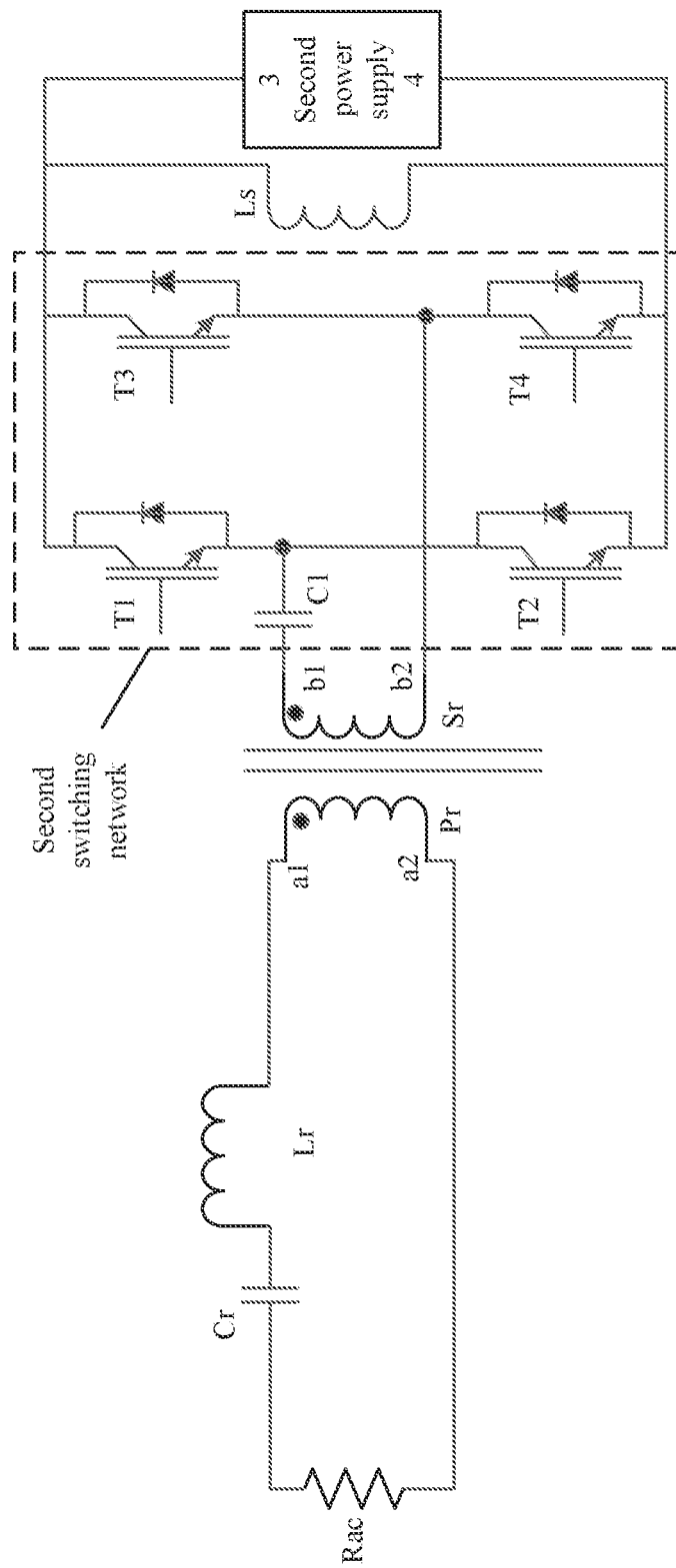
FIG. 8 is a schematic diagram of a structure of an equivalent circuit in which a power converter operates inversely.

An equivalent circuit of the power converter when the power converter operates inversely is shown in FIG. 8. The secondary side circuit 1002 transmits electric energy to the transformer 1003, and the transformer 1003 supplies electric energy to the primary side circuit 1001. In this case, the excitation inductor Lp in the primary side circuit 1001 does not participate in resonance, and the primary side circuit 1001 may be equivalent to a load resistor Rac, the resonant capacitor Cr, and the resonant inductor Lr that are connected in series. A voltage gain G(f) of the power converter when the power converter operates inversely is related to a switching frequency f of the secondary side circuit 1002. The voltage gain G(f) can be calculated by using a formula $$G(f) = \left| \frac{Rac}{Rac + j(2\pi f)Lr + \frac{1}{j(2\pi f)Cr}} \right|.$$

As shown in FIG. 6, a voltage transmitted by the secondary side circuit 1002 to the transformer 1003 is a square wave voltage. It is assumed that energy of a square wave signal is mainly transmitted by a fundamental wave component. According to a fundamental wave approximation principle, a voltage gain $$G0(f) = \left| \frac{Rac}{Rac + j(2\pi f)Lr + \frac{1}{j(2\pi f)Cr}} \right| \times \frac{Np}{Ns} \times \cos\left(\frac{\pi}{2} - \pi^2 f \sqrt{Cr \times Lr}\right)$$

when the power converter operates inversely, and the voltage gain $G0(f)$ may be approximately $$\frac{2\pi \times Np \times \sin(\pi^2 f \sqrt{Cr \times Lr}) \times |Cr| \times |Rac| \times |f|}{Ns|2\pi \times Cr \times Rac \times f - i + 4i \times \pi^2 \times Cr \times Lr \times f^2|},$$

where Np is the number of turns of the primary side winding Pr, and Ns is the number of turns of the secondary side winding Sr.

According to the relationship between the voltage gain $G0(f)$ when the power converter operates inversely and the switching frequency f of the secondary side circuit 1002, it can be learned that increasing the switching frequency f can reduce the voltage gain $G0(f)$ and increase an inverse gain range. In order to increase the inverse gain range, the controller 1000 may control the secondary side circuit 1002 to transmit electric energy to the transformer 1003 in a control cycle, so that the secondary side circuit 1002 operates in the control cycle, and the control cycle is also an operating cycle of the secondary side circuit 1002. Duration of the control cycle is longer than or equal to a resonance cycle of the LLC resonant circuit, and duration of the operating cycle of the secondary side circuit 1002 (for example, a switching cycle of each switch) is longer than or equal to the resonance cycle of the LLC resonant circuit. In the design, an operating frequency of the secondary side circuit 1002 may be less than or equal to a resonance frequency of the LLC resonant circuit. In addition, a current in the secondary side circuit 1002 is reduced, so that each switch in the secondary side circuit 1002 is disconnected when the current is low, and a disconnection current in the secondary side circuit 1002 is reduced, so that the switch is prevented from being damaged. Optionally, the controller 1000 may generate a secondary side control signal based on preconfigured duration of the switching cycle, so that the operating frequency of the secondary side circuit 1002 is less than or equal to the resonance frequency of the LLC resonant circuit. A switching frequency corresponding to the preconfigured duration of the switching cycle is the operating frequency of the secondary side circuit 1002.

In a possible implementation, the controller 1000 may increase a switching cycle of each switch of the secondary side circuit 1002, for example, increase duration T0 of the switching cycle, and may further reduce the switching frequency, thereby reducing the voltage gain, and increasing the inverse gain range. For example, the controller 1000 may receive a control instruction, and the control instruction may instruct the controller 1000 to increase the duration of the switching cycle of the secondary side circuit 1002, for example, reduce the operating frequency of the secondary side circuit 1002, and may further reduce the voltage gain when the power converter operates inversely, thereby implementing an inverse voltage gain range.

In another possible implementation, in a process of generating the secondary side control signal, the controller 1000 may perform phase shift processing (which may also be referred to as lagging processing) on a control signal of a switch included in one bridge arm in the second switching network, and reduce duration for transmitting electric energy from the secondary side circuit 1002 to the primary side circuit 1002 in each control cycle, to increase the gain range. For example, the controller 1000 performs phase shift processing on the control signals of the switch T1 and the switch T2 included in the bridge arm 3. Alternatively, the controller 1000 performs phase shift processing on the control signals of the switch T3 and the switch T4 included in the bridge arm 4.

Figure 9:
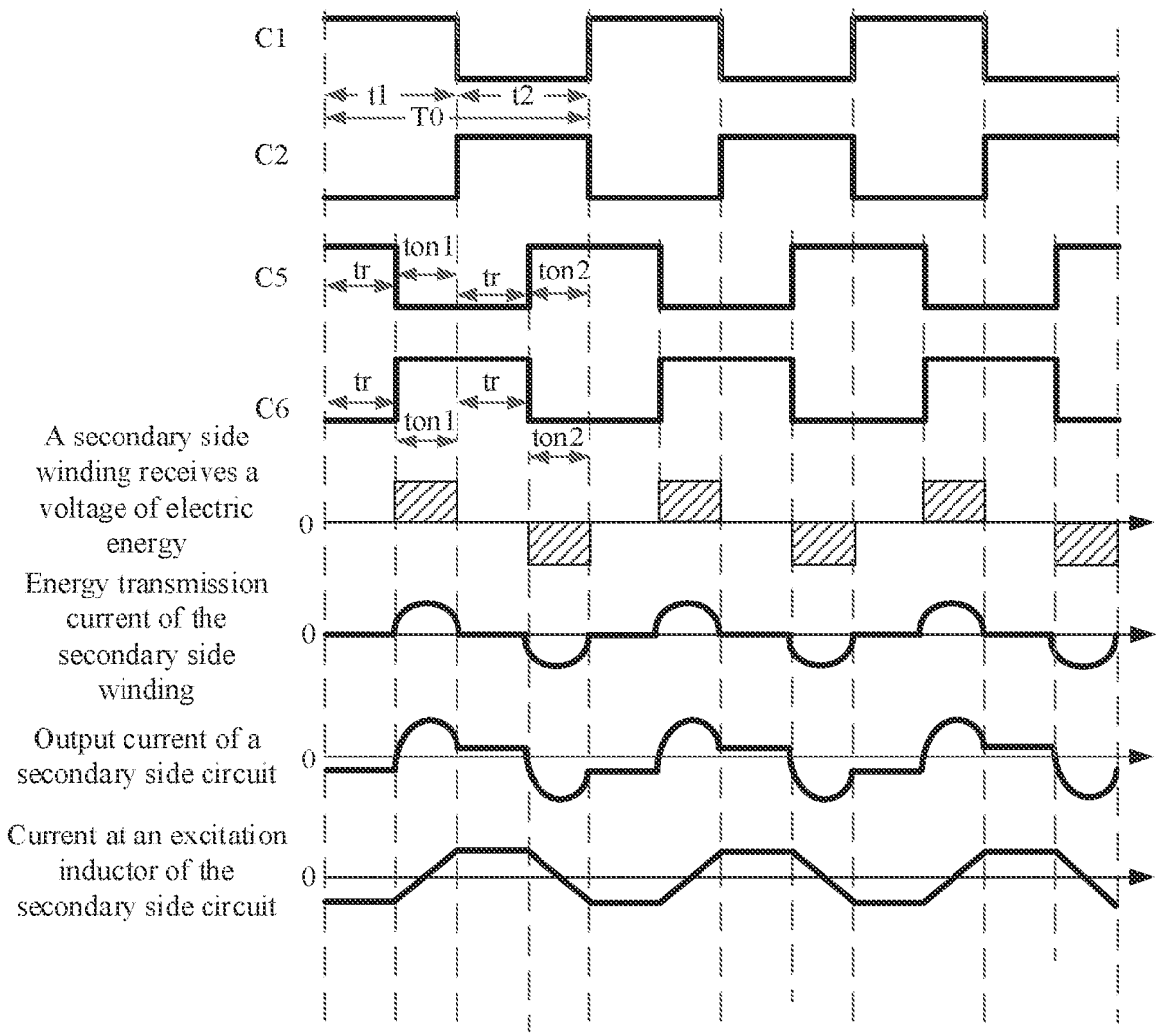
FIG. 9 is a schematic diagram of a control signal of a switch in a secondary side circuit according to an embodiment of this application.

In an example, after the controller 1000 performs phase shift processing on the control signals of the switch T3 and the switch T4 included in the bridge arm 4, each control signal is shown in FIG. 9. The control signal C1 is used to control the switch T1 to be conducted and disconnected. The control signal C2 is used to control the switch T2 to be conducted and disconnected. The control signal C5 is used to control the switch T3 to be conducted and disconnected. The control signal C6 is used to control the switch T4 to be conducted and disconnected. The control signal C5 and the control signal C6 are complementary.

Compared with the control signal C2, an initial phase of the control signal C5 lags by duration tr, or the initial phase of the control signal C5 is phase shifted by the duration tr, or a start moment of a high level and a start moment of a low level in each control cycle are delayed by the duration tr. Compared with the control signal C1, an initial phase of the control signal C6 also lags by tr, or a start moment of a high level and a start moment of a low level in each control cycle are delayed by the duration tr.

In a time period t1 of each control cycle (also a first half cycle of each control cycle), a level of the control signal C1 is a high level, so that the switch T1 can be conducted. A level of the control signal C2 is a low level, so that the switch T2 can be disconnected. A level of the control signal C5 in a time period tr in the time period t1 is a high level, and the level of the control signal C5 in a time period ton1 is a low level, so that the switch T3 can be conducted in the time period tr, and the switch T3 can be disconnected in the time period ton1. A level of the control signal C6 is a low level in the time period tr in the time period t1, and the level of the control signal C6 in the time period ton1 is a high level, so that the switch T4 can be disconnected in the time period tr in the time period t1, and the switch T4 can be conducted in time period ton1. The design may enable the secondary side circuit 1002 to output electric energy to the secondary side winding Sr in the time period ton1 in the time period t1 of each control cycle (as shown in FIG. 9, a case in which the secondary side winding receives a voltage of electric energy).

In a time period ton1 in a time period t1 of a cycle T0, a current is input from a high potential end (for example, an end connected to the positive electrode of the second power supply) of the secondary side circuit 1002, sequentially flows through the switch T1, the secondary side winding Sr, and the switch T4, and is output from a low potential end of the secondary side circuit 1002. As shown in FIG. 9, a voltage of electric energy received by the secondary side winding Sr is in a positive half cycle, and duration of receiving the electric energy is duration of the time period ton1, for example, energy transmission duration of the positive half cycle is less than duration of the time period t1, and no energy is transmitted in the time period tr. Compared with a case in which the secondary side winding Sr receives a voltage of electric energy in FIG. 6, in this embodiment of this application, the controller 1000 drives each switch in the secondary side circuit 1002 by using the secondary side control signal, and energy transmission duration in the first half cycle of each control cycle may be reduced from the duration of the time period t1 (shown in FIG. 9) to the duration of the time period ton1.

In the time period t2 of each control cycle (also a second half cycle of each control cycle), the level of the control signal C1 is a low level, so that the switch T1 can be disconnected. The level of the control signal C2 is a high level, so that the switch T2 can be conducted. The level of the control signal C5 in the time period tr in the time period t2 is a low level, and the level of the control signal C5 in a time period ton2 is a high level, so that the switch T3 can be disconnected in the time period tr, and the switch T3 can be conducted in the time period ton2. The level of the control signal C6 is a high level in the time period tr in the time period t2, and the level of the control signal C6 in the time period ton2 is a low level, so that the switch T4 can be conducted in the time period tr in the time period t2, and the switch T4 can be disconnected in time period ton2. The design may enable the secondary side circuit 1002 to output electric energy to the secondary side winding Sr in the time period ton2 in the time period t2 of each control cycle (as shown in FIG. 9, a case in which the secondary side winding receives a voltage of electric energy).

In a time period ton2 in a time period t2 of a control cycle T0, a current is input from a high potential end (for example, an end connected to the positive electrode of the second power supply) of the secondary side circuit 1002, sequentially flows through the switch T3, the secondary side winding Sr, and the switch T3, and is output from a low potential end of the secondary side circuit 1002. As shown in FIG. 9, a voltage of electric energy received by the secondary side winding Sr is in a negative half cycle, and duration of receiving the electric energy is the duration of the time period ton2, for example, energy transmission duration of the negative half cycle is less than the duration of the time period t2, and no energy is transmitted in the time period tr. Compared with a case in which the secondary side winding Sr receives a voltage of electric energy in FIG. 6, in this embodiment of this application, the controller 1000 drives each switch in the secondary side circuit 1002 by using the secondary side control signal, and energy transmission duration in the second half cycle of each control cycle may be reduced from the duration of the time period t2 (shown in FIG. 9) to the duration of the time period ton2.

In this embodiment of this application, in the time period ton1 and the time period ton2 in each control cycle, electric energy may be transmitted from the secondary side circuit 1002 to the primary side circuit 1001 in a form of resonance. Therefore, an energy transmission current can be approximated to a sinusoidal current (an energy transmission current of the secondary side winding as shown in FIG. 9). The secondary side circuit 1002 may have a small disconnection current to reduce a disconnection loss of the switch. The duration of the time period t1 is the same as the duration of the time period t2, so that the duration of the time period ton1 in the time period t1 is the same as the duration of the time period ton2 in the time period t2. In an example, energy transmission duration in a first half cycle of a cycle is equal to energy transmission duration in a second half cycle of the cycle. For ease of description, the energy transmission duration in the first half cycle and the energy transmission duration in the second half cycle are each denoted as a time period ton. In each control cycle, duration of electric energy transmission from the secondary side circuit 1002 to the secondary side winding Sr decreases, thereby reducing the inverse gain and increasing the inverse gain range.

For example, duration of the time period ton may be equal to duration of a half cycle of the resonance cycle of the LLC resonant circuit in the primary side circuit 1001. Usually, the resonance cycle of the LLC resonant circuit is a circuit formed by elements that participate in resonance when the power converter operates inversely, for example, the resonance cycle may be determined based on parameters of the resonant capacitor Cr and the resonant inductor Lr.

In a possible design, the controller 1000 may determine the lagging duration tr, for example, determine the phase shift duration based on the cycle duration T0 and the energy transmission duration ton of the switching cycle of the secondary side circuit 1002. For example, $$tr = Ts - \text{ton}, \text{ where } Ts = \frac{1}{2}T0.$$

For example, the energy transmission duration ton may be prestored or configured in the controller 1000, or the controller 1000 may receive a first control instruction, where the first control instruction may carry a parameter of the energy transmission duration ton. The controller 1000 may determine, based on the cycle duration T0 and the energy transmission duration ton of the switching cycle of the secondary side circuit 1002, lagging duration tr of a control signal of a bridge arm (for example, the bridge arm 4) of the secondary side circuit 1002, so that a phase difference between control signals of switches of two bridge arms of the second switching network in the secondary side circuit 1002 is tr.

In an example, the cycle duration T0 of the switching cycle of the secondary side circuit 1002 may be prestored or configured in the controller 1000, or the controller 1000 may receive a second control instruction, where the second control instruction may carry a parameter of the cycle duration T0. The controller 1000 may adjust the control signal of each switch in the secondary side circuit 1002 based on the cycle duration T0.

The controller 1000 may increase the cycle duration T0 of the switching cycle of the secondary side circuit 1002 to reduce the switching frequency of the secondary side circuit 1002. In the design, the controller 1000 reduces a ratio (ton/TS) of the energy transmission duration ton to a half switching cycle Ts in the secondary side circuit 1002 by reducing the switching frequency of the secondary side circuit 1002, thereby reducing the energy transmission, reducing the gain, and increasing the gain range. Optionally, the half switching cycle Ts may be greater than the half of the resonance cycle of the LLC resonant circuit of the primary side circuit 1001.

In another possible design, the controller 1000 may adjust the control signal of each switch in the secondary side circuit 1002 based on the cycle duration T0 and the lagging duration tr of the switching cycle of the secondary side circuit 1002. For example, the lagging duration tr may be prestored or configured in the controller 1000, or the controller 1000 may receive a third control instruction, where the third control instruction may carry a parameter of the lagging duration tr. The controller 1000 may adjust a control signal (for example, the bridge arm 4) of a bridge arm in the second switching network of the secondary side circuit 1002, so that a phase difference between control signals of two bridge arms is the lagging duration tr.

For example, the controller 1000 may adjust a length of the lagging duration tr. The controller 1000 increases the lagging duration tr, so that the energy transmission duration ton decreases. The design can reduce the energy transmission duration in each control cycle T0, thereby reducing the gain and increasing the gain range.

In a possible design, the secondary side circuit 1002 includes an excitation inductor Ls, where the excitation inductor Ls is connected in parallel to the second switching network. When the controller 1000 drives a switch in the second switching network, the excitation inductor Ls in the secondary side circuit 1002 may generate a lagging current (as shown in FIG. 8). In this case, an output current of the secondary side circuit 1002 is a sum of an energy transmission current at the secondary side winding Sr and a current generated at the excitation inductor Ls. In the design, the lagging current generated by the excitation inductor Ls in the secondary side circuit 1002 favors ZVS soft-switching of the switches in the second switching network in the secondary side circuit 1002 (for example, the switch T1 and the switch T2 on the arm 1 and the switch T3 and the switch T4 on the arm 2).

Usually, factors such as switching speeds of two switches on each bridge arm in the second switching network of the secondary side circuit 1002 may cause two switches on one bridge arm to be simultaneously conducted. To avoid this situation, when generating the secondary side control signal, the controller 1000 may add a dead time period tdead before a start moment at which a control signal of each switch is a high level (used to drive the switch to be in a conducted state) and after an end moment at which the control signal of each switch is a high level, or add a dead time period tdead before a start moment at which the control signal of each switch is a low level and after an end moment at which the control signal of each switch is a low level.

Figure 10:
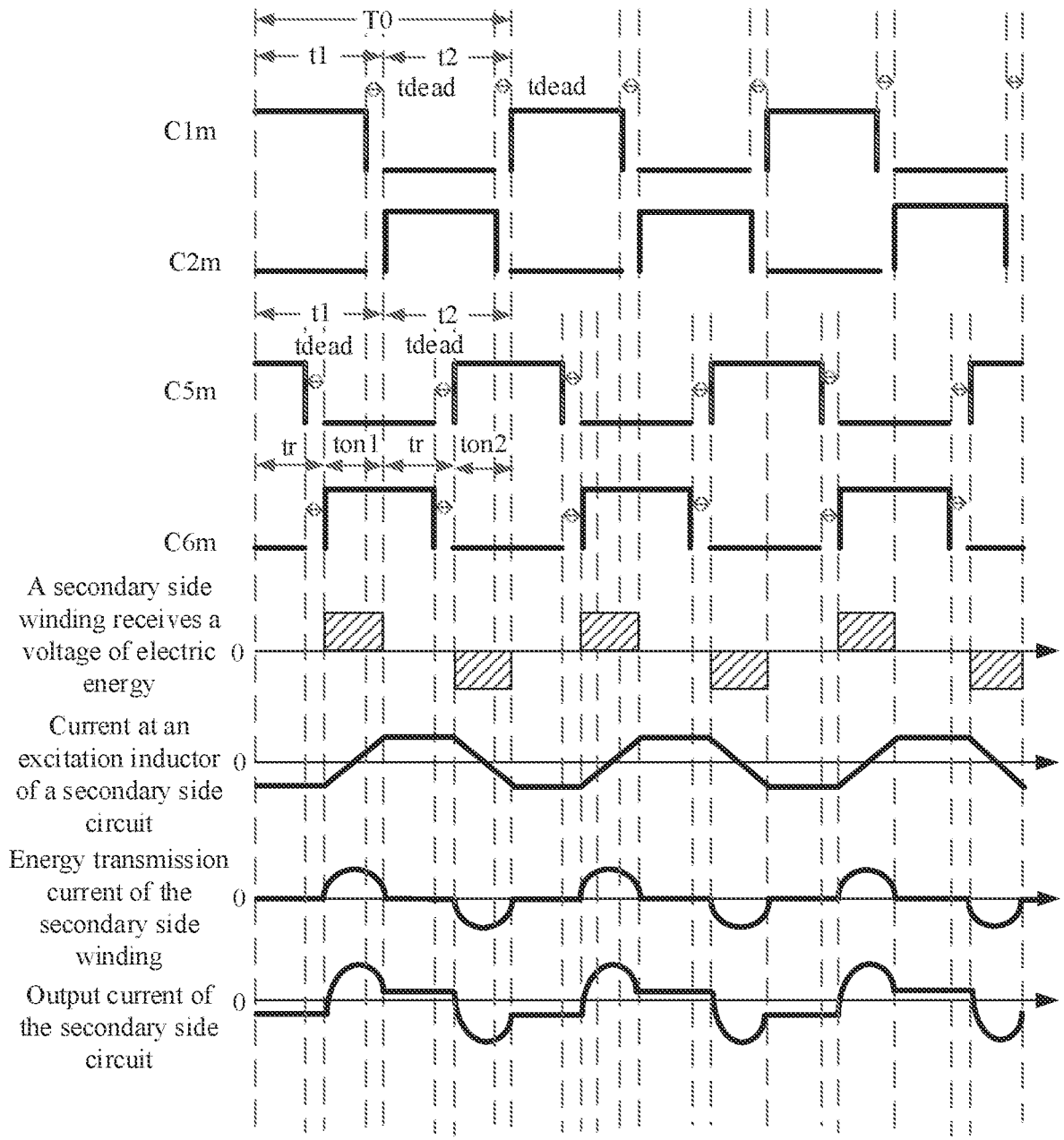
FIG. 10 is a schematic diagram of a control signal of a switch in a secondary side circuit according to an embodiment of this application.

As shown in FIG. 10, the control signal C1m is used to control the switch T1 to be conducted and disconnected. The control signal C2m is used to control the switch T2 to be conducted and disconnected. The control signal C5m is used to control the switch T3 to be conducted and disconnected. The control signal C6m is used to control the switch T4 to be conducted and disconnected. In a dead time period tdead in the time period t1 and a dead time period tdead in the time period t2, each control signal has no level, for example, the switch is not driven in the dead time period. In a non-dead time period in the time period t1 and a non-dead time period in the time period t2, the control signal C1m and the control signal C2m are complementary, and the control signal C5m and the control signal C6m are complementary.

In each control cycle, when the secondary control signal C6m is in a high level time period and the secondary control signal C1m is in a high level time period or a dead time period tdead, and when the secondary control signal C5m is in the high level time period and the secondary control signal C2m is in the high level time period or the dead time period tdead, a voltage of electric energy received by the secondary side winding is not zero. In other words, in this case, the secondary side circuit 1002 supplies electric energy to the transformer, and a current output by the secondary side circuit 1002 to the secondary side winding Sr is not zero, so that a current in the secondary side winding Sr is not zero. It can be learned that in a scenario in which each control cycle includes a dead time period, energy may also be transmitted in the dead time period.

In a possible implementation, when the power converter operates inversely, and the controller 1000 controls the switches in the second switching network of the secondary side circuit 1002, the controller 1000 may further control the switches in the first switching network of the primary side circuit 1001, to implement synchronous rectification. For example, the controller 1000 generates a drive signal of each switch in the first switching network based on a preset PWM wave transmission mode (synchronous rectification wave transmission logic). Conduction duration of each switch may be less than or equal to half of the resonance cycle of the LLC resonant circuit.

In addition, this application further provides an electronic device, and the electronic device may include the power converter provided in the embodiment of this application. The electronic device may be used in a scenario with forward and inverse power conversion requirements, for example, a scenario such as an energy storage system, an uninterruptible power supply (uninterruptible power supply, UPS) system, or a smart vehicle.

In an example, the electronic device provided in this application may be an on board charger (on board charger, OBC). The OBC may include a first interface, a second interface, and the power converter provided in the foregoing embodiments. An input end of the primary side circuit 1001 in the power converter may be the first interface, and is used to connect to a first power supply or a first energy storage apparatus. An input end of the secondary side circuit 1002 in the power converter may be the second interface, and is used to connect to a second power supply or a second energy storage apparatus. Optionally, the second power supply or the second energy storage apparatus may be a power battery.

The first interface of the OBC may be connected to an external power supply or to an external charging apparatus, such as a charging pile. The power converter may be in a forward operating condition, and the primary side circuit 1001 transmits electric energy input from the external power supply or the external charging apparatus to the secondary side circuit 1002.

The first interface of the OBC may alternatively be connected to the first power supply or the first energy storage apparatus. The power converter may be in an inverse operating condition, and the secondary side circuit 1002 transmits electric energy at the second power supply or the second energy storage apparatus to the primary side circuit 1001, and supplies the electric energy to the first power supply or the first energy storage apparatus.

Based on the foregoing embodiments, this application further provides a method for increasing an inverse gain range of a power converter, which may be applied to the power converter. The power converter may include a primary side circuit, a secondary side circuit, and a transformer. A primary side of the transformer is connected to the primary side circuit, and a secondary side of the transformer is connected to the secondary side circuit. The primary side circuit includes a resonant circuit. When the power converter operates inversely, the secondary side circuit is configured to supply electric energy to the transformer. The transformer is configured to supply the electric energy to the primary side circuit. The primary side circuit is configured to convert the electric energy. For structures such as the primary side circuit, the secondary side circuit, and the transformer, refer to the foregoing embodiments, and details are not described herein again.

Figure 11:
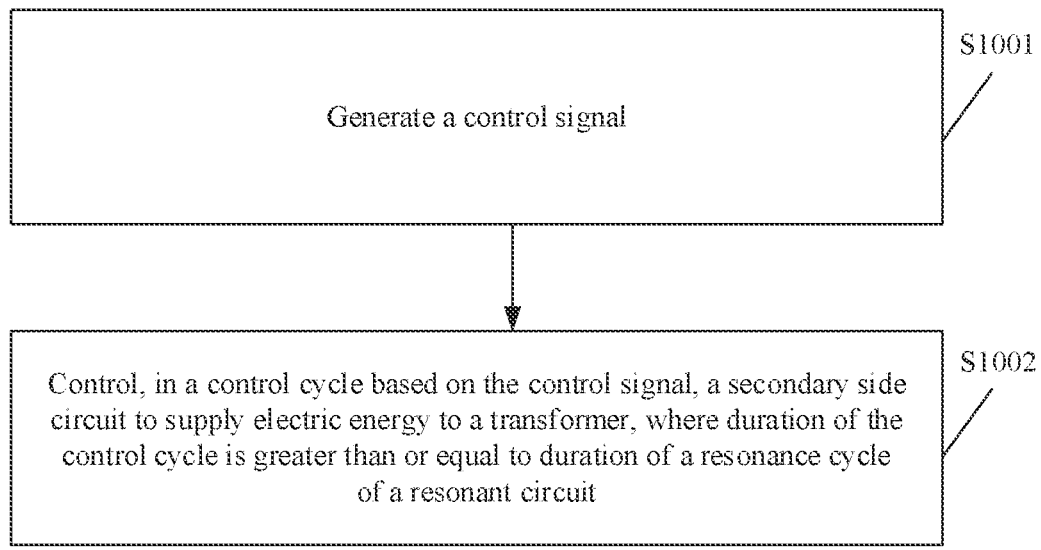
FIG. 11 is a schematic flowchart of a method for increasing an inverse gain range of a power converter according to an embodiment of this application.

The method for increasing an inverse gain range of a power converter provided in this application may be performed by a control apparatus or a controller. As shown in FIG. 11, the method may include the following steps:

Step S1001: Generate a control signal.

In this embodiment of this application, the control apparatus may obtain information such as duration of a control cycle of the secondary side circuit, and generate a control signal whose cycle is the control cycle. Duration of the control cycle of the secondary side circuit may be greater than duration of a resonance cycle of an LLC resonant circuit of the primary side circuit. Alternatively, a switching frequency of the secondary side circuit may be less than a resonance frequency of the LLC resonant circuit of the primary side circuit, where the resonance frequency is determined based on a structure of the LLC resonant circuit.

Step S1002: Control, in the control cycle based on the control signal, the secondary side circuit to supply the electric energy to the transformer, where the duration of the control cycle is greater than or equal to the duration of the resonance cycle of the resonant circuit.

In a possible implementation, when the control apparatus controls, in the control cycle based on the control signal, the secondary side circuit to supply the electric energy to the transformer, the control apparatus may drive a first upper bridge arm switch T1 by using a first control signal, drive a first lower bridge arm switch T2 by using a second control signal, drive a second upper bridge arm switch T3 by using a third control signal, and drive a second lower bridge arm switch T4 by using a fourth control signal.

In each control cycle, when a level of the first control signal is a first level, a level of the second control signal is a second level, and when the level of the first control signal is the second level, the level of the second control signal is the first level; in each control cycle, when a level of the third control signal is the first level, a level of the fourth control signal is the second level, and when the level of the third control signal is the second level, the level of the fourth control signal is the second level; and the first level is used to drive the switch to be in a conducted state, and the second level is used to drive the switch to be in a disconnected state.

In each control cycle, both the level of the first control signal and the level of the fourth control signal are first duration of the first level, where the first duration is less than or equal to half of the resonance cycle, and both the level of the second control signal and the level of the third control signal are second duration of the first level, where the second duration is less than or equal to half of the resonance cycle.

In a possible design, the control apparatus may increase the duration of the control cycle, to reduce switching frequencies of the upper bridge arm switch and the lower bridge arm switch, where the operating frequency is less than or equal to the resonance frequency of the resonant circuit.

In an example, after receiving a first instruction, the control apparatus may increase switching cycle duration, for example, decrease the switching frequency. In the design, reducing the switching frequency and increasing the switching cycle can reduce a ratio of energy transmission duration to the switching cycle duration, thereby reducing a gain when the power converter operates inversely and increasing a gain range when the power converter operates inversely.

In a possible implementation, in each control cycle, a time difference between a first start moment at which the first control signal is the first level and a second start moment at which the fourth control signal is the first level is greater than zero. The control apparatus may increase the time difference, to shorten the first duration and the second duration. In this embodiment of this application, the time difference may be a phase difference between the first control signal and the fourth control signal, or the control apparatus may perform lagging processing or phase shift processing on a drive signal of a switch of a bridge arm in the secondary side circuit. The phase difference (also lagging duration) may be determined based on the switching cycle duration and the energy transmission duration. For example, the phase difference tr may be half of a time difference between the switching cycle duration and the energy transmission duration.

In an example, after receiving a second instruction, the control apparatus may increase the time difference, to shorten the first duration ton1 and the second duration ton2. In the design, the energy transmission duration is reduced, thereby reducing a gain, and increasing a gain range when the power converter operates inversely.

Figure 12:
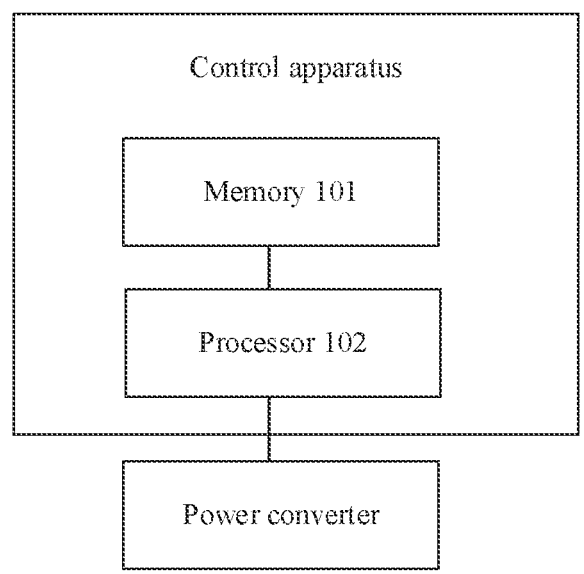
FIG. 12 is a schematic diagram of a structure of a control apparatus according to an embodiment of this application.

In a possible implementation, the control apparatus may include a memory 1101 and a processor 1102. The processor 1102 may be connected to the power converter, and may drive the switch in the secondary side circuit of the power converter. As shown in FIG. 12, the memory may be a random-access memory (RAM), a flash memory, a read-only memory (ROM), an electrically programmable ROM (EPROM) memory or a non-volatile read-only memory, a register, a hard disk, a removable disk, or the like.

The memory 1011 may store computer instructions. When the computer instructions stored in the memory 1101 are executed by the processor 1102, the processor 1102 may be configured to perform a method for increasing an inverse gain range of a power converter. The memory 1101 may further store data, for example, information such as the switching cycle duration of the secondary side circuit and the energy transmission duration that are described in the foregoing embodiments.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer program instructions are loaded and executed on a computer, all or some of the procedures or functions are generated according to embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), a semiconductor medium (for example, a solid-state drive (SSD)), or the like.

An embodiment of this application further provides a readable storage medium, configured to store the method or algorithm provided in the foregoing embodiments, for example, a RAM, a flash memory, a ROM, an EPROM memory, a non-volatile read only memory, a register, a hard disk, a removable disk, or a storage medium in any form in this field.

Steps of the method or algorithm described in the embodiments of this application may be directly embedded into a control apparatus or a controller in a power converter. The control apparatus may include a RAM memory, a flash memory, a ROM memory, an EPROM memory, a register, a hard disk, a removable magnetic disk, or a storage medium in any form in this field, and is configured to store steps of the method or algorithm provided in the embodiments of this application. For example, the storage medium may be connected to a control module or a processor (or the controller), so that the control module or the processor (or the controller) may read information from the storage medium, and may write and store information to the storage medium. Optionally, the storage medium may be further integrated into the control module or the processor (or the controller).

In addition, this application further provides a chip coupled to a memory and configured to invoke and execute computer program instructions stored in the memory, so that a method for increasing an inverse gain range of a power converter is performed.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a function in one or more processes in the flowcharts and/or in one or more blocks in the block diagrams.

Although this application is described with reference to specific features and the embodiments thereof, it is clear that various modifications and combinations may be made to them without departing from the scope of this application. Correspondingly, the specification and accompanying drawings are merely example description of this application defined by the accompanying claims, and are considered as any of or all modifications, variations, combinations or equivalents that cover the scope of this application.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A power converter, comprising:
    a primary side circuit comprising a resonant circuit, wherein the primary side circuit is configured to convert electric energy that is received;
    a secondary side circuit comprising a switching network, wherein the switching network comprises:
        a first bridge arm, comprising:
            a first upper bridge arm switch; and
            a first lower bridge arm switch connected with the first upper bridge arm switch; and
        a second bridge arm connected in parallel with the first bridge arm, wherein the second bridge arm comprises:
            a second upper bridge arm switch; and
            a second lower bridge arm switch connected with the second upper bridge arm switch;
    a transformer comprising:
        a secondary side connected to the secondary side circuit and configured to receive electric energy from the secondary side circuit; and
        a primary side connected to the primary side circuit and configured to supply the electric energy to the primary side circuit; and
    a controller connected to each of the first upper bridge arm switch, the first lower bridge arm switch, the second upper bridge arm switch, and the second lower bridge arm switch, wherein the controller is configured to:
        drive the first upper bridge arm switch using a first control signal;
        drive the first lower bridge arm switch using a second control signal;
        drive the second upper bridge arm switch using a third control signal;
        drive the second lower bridge arm switch using a fourth control signal;
        control, in a control cycle using the first control signal, the second control signal, the third control signal, and the fourth control signal, the secondary side circuit to supply the electric energy to the transformer,
    wherein, in the control cycle, a time difference between a first start moment at which the first control signal is a first level and a second start moment at which the fourth control signal is the first level is greater than zero,
    wherein a first time period of the control cycle comprises a first duration and a second duration, and wherein the second duration is less than or equal to half of a resonance cycle,
    wherein a second time period of the control cycle comprises a third duration and a fourth duration, wherein the fourth duration is less than or equal to half of the resonance cycle,
    wherein, in the first duration, the first control signal is the first level, the second control signal is a second level, the third control signal is the first level and is switched to a null level, and the fourth control signal is the second level and is switched to the null level,
    wherein, in the second duration, the first control signal is the first level and is switched to the null level, the second control signal is the second level and is switched to the null level, the third control signal is the second level, and the fourth control signal is the first level,
    wherein, in the third duration, the first control signal is the second level, the second control signal is the first level, the third control signal is the second level and is switched to the null level, and the fourth control signal is the first level and is switched to the null level,
    wherein, in the fourth duration, the first control signal is the second level and is switched to the null level, the second control signal is the first level and is switched to the null level, the third control signal is the first level, and the fourth control signal is the second level, and
    wherein the first level is configured to drive the first upper bridge arm switch, the first lower bridge arm switch, the second upper bridge arm switch, and the second lower bridge arm switch, wherein the second level is configured to drive the first upper bridge arm switch, the first lower bridge arm switch, the second upper bridge arm switch, and the second lower bridge arm switch, and wherein the null level is a zero level and is configured to switch off the first upper bridge arm switch, the first lower bridge arm switch, the second upper bridge arm switch, and the second lower bridge arm switch, increase the second duration of the first time period of the control cycle to reduce a switching frequency of the first upper bridge arm switch and the first lower bridge arm switch, and wherein the switching frequency is less than or equal to a resonance frequency of the resonant circuit, wherein the second duration of the first time period of the control cycle is greater than or equal to a resonant duration of the resonance cycle of the resonant circuit, and increase the time difference to shorten the second duration and the fourth duration.

2. The power converter of claim 1, wherein the first upper bridge arm switch comprises a first control end, wherein the first lower bridge arm switch comprises a second control end, wherein the first lower bridge arm switch is connected in series with the first upper bridge arm switch, wherein a connection point between the first upper bridge arm switch and the first lower bridge arm switch is at a first end of the secondary side, wherein the second upper bridge arm switch comprises a third control end, wherein the second lower bridge arm switch comprises a fourth control end, wherein the second lower bridge arm switch is connected in series with the second upper bridge arm switch, wherein a connection point between the second upper bridge arm switch and the second lower bridge arm switch is at a second end of the secondary side, and wherein the controller is connected to each of the first control end, the second control end, the third control end, and the fourth control end.

3. The power converter of claim 2, wherein the secondary side circuit further comprises an excitation inductor, wherein the excitation inductor is connected in parallel to the switching network, and wherein the excitation inductor is configured to enable the first upper bridge arm switch, the first lower bridge arm switch, the second upper bridge arm switch, and the second lower bridge arm switch to be in the conducted state or the disconnected state when a voltage is zero.

4. An electronic device, comprising:
a power converter, comprising:
a primary side circuit comprising a resonant circuit and a primary side input end, wherein primary side circuit is configured to:
convert electric energy that is received; and
connect to a first power supply or a first energy storage apparatus;
a secondary side circuit configured to supply electric energy, wherein the secondary side circuit comprises a secondary side input end configured to connect to a second power supply or a second energy storage apparatus, wherein the secondary side circuit comprises a switching network, and wherein the switching network comprises:
a first bridge arm, comprising:
a first upper bridge arm switch; and
a first lower bridge arm switch connected with the first upper bridge arm switch; and
a second bridge arm connected in parallel with the first bridge arm, wherein the second bridge arm comprises:
a second upper bridge arm switch; and
a second lower bridge arm switch connected with the second upper bridge arm switch;
a transformer comprising:
a primary side connected to the primary side circuit and configured to supply the electric energy to the primary side circuit; and
a secondary side connected to the secondary side circuit and configured to receive the electric energy from the secondary side circuit; and
a controller connected to each of the first upper bridge arm switch, the first lower bridge arm switch, the second upper bridge arm switch, and the second lower bridge arm switch, wherein the controller is configured to:
drive the first upper bridge arm switch using a first control signal;
drive the first lower bridge arm switch using a second control signal;
drive the second upper bridge arm switch using a third control signal;
drive the second lower bridge arm switch using a fourth control signal;
control, in a control cycle using the first control signal, the second control signal, the third control signal, and the fourth control signal, the secondary side circuit to supply the electric energy to the transformer,
wherein, in the control cycle, a time difference between a first start moment at which the first control signal is a first level and a second start moment at which the fourth control signal is the first level is greater than zero,
wherein a first time period of the control cycle comprises a first duration and a second duration, and wherein the second duration is less than or equal to half of a resonance cycle,
wherein a second time period of the control cycle comprises a third duration and a fourth duration, wherein the fourth duration is less than or equal to half of the resonance cycle,
wherein, in the first duration, the first control signal is the first level, the second control signal is a second level, the third control signal is the first level and is switched to a null level, and the fourth control signal is the second level and is switched to the null level,
wherein, in the second duration, the first control signal is the first level and is switched to the null level, the second control signal is the second level and is switched to the null level, the third control signal is the second level, and the fourth control signal is the first level,
wherein, in the third duration, the first control signal is the second level, the second control signal is the first level, the third control signal is the second level and is switched to the null level, and the fourth control signal is the first level and is switched to the null level,
wherein, in the fourth duration, the first control signal is the second level and is switched to the null level, the second control signal is the first level and is switched to the null level, the third control signal is the first level, and the fourth control signal is the second level, and
wherein the first level is configured to drive the first upper bridge arm switch, the first lower bridge arm switch, the second upper bridge arm switch, and the second lower bridge arm switch, wherein the second level is configured to drive the first upper bridge arm switch, the first lower bridge arm switch, the second upper bridge arm switch, and the second lower bridge arm switch, and wherein the null level is a zero level and is configured to switch off the first upper bridge arm switch, the first lower bridge arm switch, the second upper bridge arm switch, and the second lower bridge arm switch, increase the second duration of the first time period of the control cycle to reduce a switching frequency of the first upper bridge arm switch and the first lower bridge arm switch, and wherein the switching frequency is less than or equal to a resonance frequency of the resonant circuit, wherein the second duration of the first time period of the control cycle is greater than or equal to a resonant duration of the resonance cycle of the resonant circuit, and increase the time difference to shorten the second duration and the fourth duration.

5. The electronic device of claim 4, wherein the first upper bridge arm switch comprises a first control end, wherein the first lower bridge arm switch comprises a second control end, wherein the first lower bridge arm switch is connected in series with the first upper bridge arm switch, wherein the second upper bridge arm switch comprises a third control end, wherein the second lower bridge arm switch comprises a fourth control end, wherein the second lower bridge arm switch is connected in series with the second upper bridge arm switch, and wherein a connection point between the second upper bridge arm switch and the second lower bridge arm switch is at a second end of the secondary side.

6. The electronic device of claim 5, wherein the secondary side circuit further comprises an excitation inductor, wherein the excitation inductor is connected in parallel to the switching network, and wherein the excitation inductor is configured to enable the first upper bridge arm switch, the first lower bridge arm switch, the second upper bridge arm switch, and the second lower bridge arm switch to be in the conducted state or the disconnected state when a voltage is zero.

7. The electronic device of claim 5, wherein the first lower bridge arm switch is connected in series with the first upper bridge arm switch.

8. The electronic device of claim 7, wherein a connection point between the first upper bridge arm switch and the first lower bridge arm switch is at a first end of the secondary side.

9. The electronic device of claim 7, wherein a connection point between the second upper bridge arm switch and the second lower bridge arm switch is at a second end of the secondary side.

10. A method for increasing an inverse gain range of a power converter, wherein the method comprises:
coupling, by a controller, a primary side of a transformer to a primary side circuit of the power converter;
coupling, by the controller, a secondary side of the transformer to a secondary side circuit of the power converter;
controlling, by the controller, the secondary side circuit to supply electric energy to the transformer;
controlling, by the controller, the transformer to supply the electric energy to the primary side circuit;
controlling, by the controller, the primary side circuit to convert the electric energy;
generating, by the controller, a control signal; and
controlling, in a control cycle based on the control signal, the secondary side circuit of the power converter to supply the electric energy to the transformer,
wherein controlling in the control cycle based on the control signal comprises:
driving a first upper bridge arm switch of the secondary side circuit using a first control signal;
driving a first lower bridge arm switch of the secondary side circuit using a second control signal;
driving a second upper bridge arm switch of the secondary side circuit using a third control signal; and
driving a second lower bridge arm switch of the secondary side circuit using a fourth control signal,
wherein, in the control cycle, a time difference between a first start moment at which the first control signal is a first level and a second start moment at which the fourth control signal is the first level is greater than zero,
wherein a first time period of the control cycle comprises a first duration and a second duration, and wherein the second duration is less than or equal to half of a resonance cycle,
wherein a second time period of the control cycle comprises a third duration and a fourth duration, wherein the fourth duration is less than or equal to half of the resonance cycle,
wherein, in the first duration, the first control signal is the first level, the second control signal is a second level, the third control signal is the first level and is switched to a null level, and the fourth control signal is the second level and is switched to the null level,
wherein, in the second duration, the first control signal is the first level and is switched to the null level, the second control signal is the second level and is switched to the null level, the third control signal is the second level, and the fourth control signal is the first level,
wherein, in the third duration, the first control signal is the second level, the second control signal is the first level, the third control signal is the second level and is switched to the null level, and the fourth control signal is the first level and is switched to the null level,
wherein, in the fourth duration, the first control signal is the second level and is switched to the null level, the second control signal is the first level and is switched to the null level, the third control signal is the first level, and the fourth control signal is the second level, and
wherein the first level is configured to drive the first upper bridge arm switch, the first lower bridge arm switch, the second upper bridge arm switch, and the second lower bridge arm switch, and wherein the second level is configured to drive the first upper bridge arm switch, the first lower bridge arm switch, the second upper bridge arm switch, and the second lower bridge arm switch, state, and wherein the null level is a zero level and is configured to switch off the first upper bridge arm switch, the first lower bridge arm switch, the second upper bridge arm switch, and the second lower bridge arm switch,
increasing the second duration of the first time period of the control cycle to reduce a switching frequency of the first upper bridge arm switch and the first lower bridge arm switch, and wherein the switching frequency is less than or equal to a resonance frequency of the resonant circuit, wherein the second duration of the first time period of the control cycle is greater than or equal to a resonant duration of the resonance cycle of the resonant circuit, and increasing the time difference to shorten the second duration and the fourth duration.

11. The method of claim 10, further comprising connecting an excitation inductor of the secondary side circuit in parallel to a switching network of the secondary side circuit to cause the first upper bridge arm switch, the first lower bridge arm switch, the second upper bridge arm switch, and the second lower bridge arm switch to be in the conducted state or the disconnected state when a voltage is zero.

* * * * *

UNITED STATES PATENT AND TRADEMARK OFFICE
CERTIFICATE OF CORRECTION

PATENT NO. : 11,909,323 B2
APPLICATION NO. : 17/847516
DATED : February 20, 2024
INVENTOR(S) : Tianyu Wang and Weiping Liu It is certified that error appears in the above-identified patent and that said Letters Patent is hereby corrected as shown below:

In the Claims

Claim 1, Column 22, Line 63: "second lower bridge arm switch, wherein the second" should read "second lower bridge arm switch to be in a conducted state, wherein the second"

Claim 1, Column 22, Line 67: "bridge arm switch, and wherein the null level is a" should read "bridge arm switch to be in a disconnected state, and wherein the null level is a"

Claim 4, Column 25, Line 2: "and the second lower bridge arm switch, and" should read "and the second lower bridge arm switch to be in a disconnected state, and"

Claim 10, Column 26, Line 53: "second lower bridge arm switch, and wherein the" should read "second lower bridge arm switch to be in a conducted state, and wherein the"

Claim 10, Column 26, Line 57: "lower bridge arm switch, state, and wherein the null" should read "lower bridge arm switch to be in a disconnected state, and wherein the null"

Signed and Sealed this
Second Day of April, 2024

Katherine Kelly Vidal
*Director of the United States Patent and Trademark Office*